(12) United States Patent
Fung et al.

(10) Patent No.: US 11,254,209 B2
(45) Date of Patent: Feb. 22, 2022

(54) SYSTEM AND METHOD FOR CONTROLLING VEHICLE SYSTEMS IN A VEHICLE

(71) Applicant: Honda Motor Co., Ltd., Tokyo (JP)

(72) Inventors: Kin C. Fung, Dublin, OH (US);
Timothy J. Dick, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 15/387,734

(22) Filed: Dec. 22, 2016

(65) Prior Publication Data
US 2017/0101111 A1    Apr. 13, 2017

Related U.S. Application Data

(63) Continuation-in-part of application No. 15/085,914, filed on Mar. 30, 2016, now Pat. No. 10,358,034, and
(Continued)

(51) Int. Cl.
| | | |
|---|---|---|
| *B60K 35/00* | (2006.01) | |
| *B60W 50/14* | (2020.01) | |
| *B60K 37/06* | (2006.01) | |

(52) U.S. Cl.
CPC ............ *B60K 35/00* (2013.01); *B60K 37/06* (2013.01); *B60W 50/14* (2013.01);
(Continued)

(58) Field of Classification Search
None
See application file for complete search history.

(56) References Cited

U.S. PATENT DOCUMENTS

| 4,706,072 A | 11/1987 | Ikeyama |
| 5,856,822 A | 1/1999 | Du et al. |

(Continued)

FOREIGN PATENT DOCUMENTS

| DE | 19545848 | 6/1997 |
| DE | 102008042342 | 4/2010 |

(Continued)

OTHER PUBLICATIONS

Office Action of U.S. Appl. No. 14/851,753 dated Mar. 22, 2017, 14 pages.
(Continued)

*Primary Examiner* — Christopher R Lamb
(74) *Attorney, Agent, or Firm* — Rankin, Hill & Clark LLP

(57) ABSTRACT

A method for controlling vehicle systems in a vehicle includes providing a steering wheel having a plurality of sensors configured to sense contact on the steering wheel. The steering wheel has a left zone and a right zone. The method includes determining a left contact value based on one or more signals received from at least one of the plurality of sensors. The left contact value indicates contact with the steering wheel within the left zone. The method includes determining a right contact value based on the one or more signals received from the at least one of the plurality of sensors. The right contact value indicates contact with the steering wheel within the right zone. The method includes determining a driver state index based on the left contact value and the right contact value and modifying control of the vehicle systems based on the driver state index.

15 Claims, 14 Drawing Sheets

Related U.S. Application Data a continuation-in-part of application No. 14/851,753, filed on Sep. 11, 2015, now Pat. No. 9,751,534, which is a continuation of application No. PCT/US2015/037019, filed on Jun. 22, 2015, and a continuation-in-part of application No. 13/843,077, filed on Mar. 15, 2013, now Pat. No. 9,420,958, and a continuation-in-part of application No. 14/074,710, filed on Nov. 7, 2013, now Pat. No. 9,398,875, and a continuation-in-part of application No. 14/573,778, filed on Dec. 17, 2014, now Pat. No. 9,352,751, said application No. PCT/US2015/037019 is a continuation-in-part of application No. 14/697,593, filed on Apr. 27, 2015, now Pat. No. 10,153,796, which is a continuation-in-part of application No. 13/858,038, filed on Apr. 6, 2013, now Pat. No. 9,272,689, said application No. PCT/US2015/037019 is a continuation-in-part of application No. 14/733,836, filed on Jun. 8, 2015, now Pat. No. 9,475,521, and a continuation-in-part of application No. 14/744,247, filed on Jun. 19, 2015, now Pat. No. 9,475,389, said application No. 14/851,753 is a continuation-in-part of application No. 13/843,077, filed on Mar. 15, 2013, now Pat. No. 9,420,958, and a continuation-in-part of application No. 14/074,710, filed on Nov. 7, 2013, now Pat. No. 9,398,875, and a continuation-in-part of application No. 14/573,778, filed on Dec. 17, 2014, now Pat. No. 9,352,751, and a continuation-in-part of application No. 14/697,593, filed on Apr. 27, 2015, now Pat. No. 10,153,796, and a continuation-in-part of application No. 14/733,836, filed on Jun. 8, 2015, now Pat. No. 9,475,521, and a continuation-in-part of application No. 14/744,247, filed on Jun. 19, 2015, now Pat. No. 9,475,389.

(60) Provisional application No. 62/016,037, filed on Jun. 23, 2014, provisional application No. 62/098,565, filed on Dec. 31, 2014, provisional application No. 62/016,020, filed on Jun. 23, 2014, provisional application No. 62/098,565, filed on Dec. 31, 2014.

(52) U.S. Cl.
CPC ... *B60K 2370/11* (2019.05); *B60K 2370/1442* (2019.05); *B60K 2370/186* (2019.05); *B60K 2370/197* (2019.05); *B60W 2050/146* (2013.01); *B60Y 2200/11* (2013.01)

(56) References Cited

U.S. PATENT DOCUMENTS

| | | | |
|---|---|---|---|
| 5,874,892 | A | 2/1999 | Antonellis et al. |
| 6,860,508 | B2 | 3/2005 | Keutz |
| 7,019,623 | B2 | 3/2006 | Grimm et al. |
| 7,109,862 | B2 | 9/2006 | Braeuchle et al. |
| 7,149,653 | B2 | 12/2006 | Bihler et al. |
| 7,321,311 | B2 | 1/2008 | Boehm et al. |
| 7,605,693 | B2 | 10/2009 | Kulas |
| 8,095,270 | B2 | 1/2012 | Bossier et al. |
| 8,243,039 | B2 | 8/2012 | Trachte |
| 8,260,482 | B1 | 9/2012 | Nemec et al. |
| 8,301,108 | B2 | 10/2012 | Naboulsi |
| 8,405,496 | B2 | 3/2013 | Bennett |
| 8,564,424 | B2 | 10/2013 | Balcom et al. |
| 8,738,224 | B2 | 5/2014 | Goldman-Shenhar |
| 8,775,023 | B2 | 7/2014 | Berglind et al. |
| 8,983,732 | B2 | 3/2015 | Andrews et al. |
| 9,475,389 | B1* | 10/2016 | Fung ..................... B60K 35/00 |
| 9,751,534 | B2 | 9/2017 | Fung et al. |
| 10,308,258 | B2 | 6/2019 | Fung et al. |
| 10,759,436 | B2 | 9/2020 | Fung et al. |
| 2003/0220725 | A1 | 11/2003 | Harter, Jr. et al. |
| 2004/0088095 | A1 | 5/2004 | Eberle et al. |
| 2005/0155808 | A1 | 7/2005 | Braeuchle et al. |
| 2007/0062753 | A1 | 3/2007 | Yoshida et al. |
| 2007/0159344 | A1 | 7/2007 | Kisacanin |
| 2009/0284361 | A1 | 11/2009 | Boddie et al. |
| 2010/0297929 | A1 | 11/2010 | Harris |
| 2011/0246028 | A1* | 10/2011 | Lisseman ............. B60K 28/066 701/45 |
| 2011/0254956 | A1* | 10/2011 | Ishikawa ............... B60W 40/08 348/148 |
| 2012/0006147 | A1 | 1/2012 | Sano |
| 2012/0212353 | A1* | 8/2012 | Fung .................. G01C 21/3697 340/905 |
| 2012/0212421 | A1 | 8/2012 | Honji |
| 2012/0290215 | A1 | 11/2012 | Adler et al. |
| 2012/0296528 | A1 | 11/2012 | Wellhoefer et al. |
| 2013/0038735 | A1 | 2/2013 | Nishiguchi et al. |
| 2013/0046154 | A1 | 2/2013 | Lin et al. |
| 2013/0245886 | A1 | 9/2013 | Fung et al. |
| 2013/0317699 | A1 | 11/2013 | Urhahne |
| 2014/0224040 | A1 | 2/2014 | Gardner et al. |
| 2014/0121903 | A1 | 5/2014 | Lee |
| 2014/0121927 | A1 | 5/2014 | Hanita |
| 2014/0156107 | A1 | 6/2014 | Karasawa et al. |
| 2014/0293053 | A1 | 10/2014 | Chuang |
| 2015/0048845 | A1 | 2/2015 | Petereit et al. |
| 2015/0258894 | A1 | 9/2015 | Crowe et al. |
| 2015/0338849 | A1 | 11/2015 | Nemec et al. |
| 2016/0016473 | A1 | 1/2016 | Van Wiemeersch et al. |
| 2016/0236690 | A1* | 8/2016 | Juneja ........................ G06F 3/16 |
| 2019/0241190 | A1 | 8/2019 | Fung et al. |

FOREIGN PATENT DOCUMENTS

| | | |
|---|---|---|
| DE | 102012017476 A1 | 3/2013 |
| DE | 102013010928 | 12/2014 |
| EP | 2591969 | 5/2013 |
| EP | 2870528 | 5/2015 |
| JP | 9156512 A | 6/1997 |
| WO | 2010013277 A1 | 2/2010 |
| WO | 2010124924 A2 | 11/2010 |
| WO | 2010124924 A3 | 7/2011 |
| WO | 2012062946 A1 | 5/2012 |
| WO | 2013117719 A1 | 8/2013 |
| WO | 2014123222 A1 | 8/2014 |

OTHER PUBLICATIONS

Office Action of U.S. Appl. No. 15/085,914 dated Dec. 14, 2017, 43 pages.

International Search Report and Written Opinion of PCT/US2015/037019 dated Nov. 2, 2015, 12 pages.

Office Action of U.S. Appl. No. 14/851,753 dated Sep. 27, 2016, 95 pages.

Office Action of U.S. Appl. No. 14/851,753 dated Dec. 21, 2016, 12 pages.

Wu, H., Rubinstein, M., Shih, E., Guttag, J. & Durand, F., Freeman, W., "Eulerian Video Magnification for Revealing Subtle Changes in the World," ACM Transactions on Graphics 31, No. 4 (Jul. 1, 2012): pp. 1-8.

Sato et al., "Touché: Enhancing Touch Interaction on Humans, Screens, Liquids, and Everyday Objects", CHI'12, May 5-10, 2012, Austin, Texas, USA, 10 pages.

Piccinini et al., "Drivers' hand positions on the steering wheel while using Adaptive Cruise Control (ACC) and driving without the system", ICOOR—Interuniversity Consortium for Optimization and Operations Research, pp. 207-216.

Langdale-Smith, N., Jan. 27, 2015. CES 2015—Seeing Machines: The Future of Automotive Safety. Retrieved from https://www.youtube.com/watch?v=obPnLufAu7o.

Poh, M., McDuff, D.J., & Picard R.W., "Advancements in Noncontact, Multiparameter Physiological Measurements Using a Webcam," IEEE Transactions on Biomedical Engineering, vol. 58, No. 1, pp. 7-11, Jan. 2011.

(56) References Cited

OTHER PUBLICATIONS

Poh, M., McDuff, D.J. & Picard R.W., "Non-contact, automated cardiac pulse measurements using video imaging and blind source separation," Optics Express, vol. 18, No. 10, pp. 10762-10774, May 10, 2010.
Wu, H., Rubinstein, M., Shih, E., Gutlag, J. & Durand, F., Freeman, W., "Eulerian Video Magnification for Revealing Subtle Changes in the World," MIT CSAIL, 8 pages.
Extended European Search Report of related application No. EP 15811941.2 dated Aug. 3, 2018, 7 pages.
Office Action of U.S. Appl. No. 15/085,914, filed Aug. 27, 2018, 16 pages.
Office Action of U.S. Appl. No. 15/085,914 dated May 2, 2018, 21 pages.
Office Action of U.S. Appl. No. 15/085,914 dated Jan. 31, 2019, 24 pages.
Notice of Allowance of U.S. Appl. No. 16/385,108 dated Apr. 21, 2020, 25 pages.
Notice of Allowance of U.S. Appl. No. 16/419,133 dated May 4, 2020, 25 pages.
Notice of Allowance of U.S. Appl. No. 16/419,145 dated Apr. 28, 2020, 13 pages.
Notice of Allowance of U.S. Appl. No. 16/419,152 dated Apr. 24, 2020, 13 pages.
Office Action of U.S. Appl. No. 16/385,108 dated Feb. 3, 2020, 106 pages.
Office Action of U.S. Appl. No. 16/419,133 dated Feb. 3, 2020, 106 pages.
Office Action of U.S. Appl. No. 16/419,145 dated Feb. 19, 2020, 117 pages.
Office Action of U.S. Appl. No. 16/419,152 dated Feb. 19, 2020, 117 pages.
Office Action of U.S. Appl. No. 16/419,161 dated Feb. 18, 2020, 109 pages.
Notice of Allowance of U.S. Appl. No. 16/419,161 dated Jun. 4, 2020, 10 pages.
Office Action of U.S. Appl. No. 15/656,595 dated Oct. 2, 2018, 143 pages.
Office Action of U.S. Appl. No. 15/720,489 dated Oct. 1, 2018, 146 pages.
Office Action of U.S. Appl. No. 16/936,222 dated Nov. 30, 2021, 112 pages.

\* cited by examiner

SYSTEM AND METHOD FOR CONTROLLING VEHICLE SYSTEMS IN A VEHICLE

RELATED APPLICATIONS

This application is a continuation-in-part of U.S. application Ser. No. 15/085,914 filed on Mar. 30, 2015, which is expressly incorporated herein by reference. This application is also a continuation-in-part of U.S. application Ser. No. 14/851,753 filed on Sep. 11, 2015, and published as U.S. Pub. No. 2016/0001781 on Jan. 7, 2016, which is also expressly incorporated herein by reference.

U.S. application Ser. No. 14/851,753 is a continuation application of International Application No. PCT/US15/37019 filed on Jun. 22, 2015, and published as International Pub. No. WO2015/200224 on Dec. 30, 2015, which is also expressly incorporated herein by reference. International Application No. PCT/US15/37019 claims priority to U.S. Prov. Application Ser. No. 62/016,037 filed on Jun. 23, 2014 and U.S. Prov. Application Ser. No. 62/098,565 filed on Dec. 31, 2014, both of which are expressly incorporated herein by reference.

In the United States, International Application No. PCT/US15/37019 is; a continuation-in-part of U.S. application Ser. No. 14/315,726 filed on Jun. 26, 2014, and issued as U.S. Pat. No. 9,505,402 on Nov. 29, 2016; a continuation-in-part of U.S. application Ser. No. 14/461,530 filed on Aug. 18, 2014, and issued as U.S. Pat. No. 9,440,646 on Sep. 13, 2016; a continuation-in-part of U.S. application Ser. No. 14/573,778 filed on Dec. 17, 2014, and now issued as U.S. Pat. No. 9,352,751 on May 31, 2016, which claims priority to U.S. Prov. Application Ser. No. 62/016,020 filed on Jun. 23, 2014; a continuation-in-part of U.S. application Ser. No. 14/697,593 filed on Apr. 27, 2015, and published as U.S. Pub. No. 2015/0229341 on Aug. 13, 2015, which is a continuation-in-part of U.S. application Ser. No. 13/858,038 filed on Apr. 6, 2013, where U.S. application Ser. No. 13/858,038 issued as U.S. Pat. No. 9,272,689 on Mar. 1, 2016; a continuation-in-part of U.S. application Ser. No. 14/733,836 filed on Jun. 8, 2015, and now issued as U.S. Pat. No. 9,475,521 on Oct. 25, 2016; and a continuation-in-part of U.S. application Ser. No. 14/744,247 filed on Jun. 19, 2015, and now issued as U.S. Pat. No. 9,475,389 on Oct. 25, 2016; all of the foregoing are expressly incorporated herein by reference.

Further, U.S. application Ser. No. 14/851,753 claims priority to U.S. Prov. Application Ser. No. 62/098,565 filed on Dec. 31, 2014, which again is expressly incorporated herein by reference.

Additionally, U.S. application Ser. No. 14/851,753 is a continuation-in-part of U.S. application Ser. No. 13/843,077 filed on Mar. 15, 2013, and issued as U.S. Pat. No. 9,420,958 on Aug. 23, 2016; a continuation-in-part of U.S. application Ser. No. 14/074,710 filed on Nov. 7, 2013, and issued as U.S. Pat. No. 9,398,875 on Jul. 26, 2016; a continuation-in-part of U.S. application Ser. No. 14/573,778 filed on Dec. 17, 2014, and now issued as U.S. Pat. No. 9,352,751 on May 31, 2016, which claims priority to U.S. Prov. Application Ser. No. 62/016,020 filed on Jun. 23, 2014; a continuation-in-part of U.S. application Ser. No. 14/697,593 filed on Apr. 27, 2015, and published as U.S. Pub. No. 2015/0229341 on Aug. 13, 2015, which is a continuation-in-part of U.S. application Ser. No. 13/858,038 filed on Apr. 6, 2013, where U.S. application Ser. No. 13/858,038 issued as U.S. Pat. No. 9,272,689 on Mar. 1, 2016; a continuation-in-part of U.S. application Ser. No. 14/733,836 filed on Jun. 8, 2015, and now issued as U.S. Pat. No. 9,475,521 on Oct. 25, 2016; and a continuation-in-part of U.S. application Ser. No. 14/744,247 filed on Jun. 19, 2015, and now issued as U.S. Pat. No. 9,475,389 on Oct. 25, 2016; all of the foregoing are expressly incorporated herein by reference.

BACKGROUND

The number of electronic distractions for a driver in a vehicle has increased. For example, portable electronic devices, peripheral devices, and other in-vehicle functions can encourage or tempt the driver to take their hands off the steering wheel while the vehicle is moving. The contact location and contact style of the driver's hands on the steering wheel can provide an indication of driver distraction. Control of certain vehicle systems should provide a balance between safe driving and appropriate use of these vehicle systems for the driver and other vehicle occupants. Accordingly, control of vehicle systems can be adapted based on detection of hand contact on a steering wheel.

BRIEF DESCRIPTION

According to one aspect, a computer-implemented method for controlling vehicle systems in a vehicle includes providing a steering wheel having a plurality of sensors configured to sense contact on the steering wheel. The steering wheel has a left zone and a right zone. The method includes determining a left contact value based on one or more signals received from at least one of the plurality of sensors. The left contact value indicates contact with the steering wheel within the left zone. The method includes determining a right contact value based on the one or more signals received from the at least one of the plurality of sensors. The right contact value indicates contact with the steering wheel within the right zone. The method includes determining a driver state index based on the left contact value and the right contact value and modifying control of the vehicle systems based on the driver state index.

In another embodiment, a system for controlling vehicle systems in a vehicle includes a steering wheel having a plurality of sensors configured to sense contact on the steering wheel, the steering wheel having a left zone and a right zone. The system includes a processor and the processor receives one or more signals from at least one of the plurality of sensors and determines a left contact value based on the one or more signals. The left contact value indicating contact with the steering wheel within the left zone. The processor determines a right contact value based on the one or more signals. The right contact value indicating contact with the steering wheel within the right zone. Further, the processor determines a driver state index based on the left contact value and the right contact value, and the processor controls the vehicle systems based on the driver state index.

In a further embodiment, a non-transitory computer readable medium comprising instructions that when executed by a processor perform a method for controlling vehicle systems in a vehicle. The method includes providing a steering wheel having a plurality of sensors configured to sense contact on the steering wheel. The steering wheel has a left zone and a right zone. The method includes determining a left contact value based on one or more signals received from at least one of the plurality of sensors. The left contact value indicates contact with the steering wheel within the left zone. The method includes determining a right contact value based on the one or more signals received from the at least one of the plurality of sensors. The right contact value indicates contact with the steering wheel within the right zone. The method includes determining a driver state index based on the left contact value and the right contact value, and modifying control of the vehicle systems based on the driver state index.

DETAILED DESCRIPTION

Figure 1A:
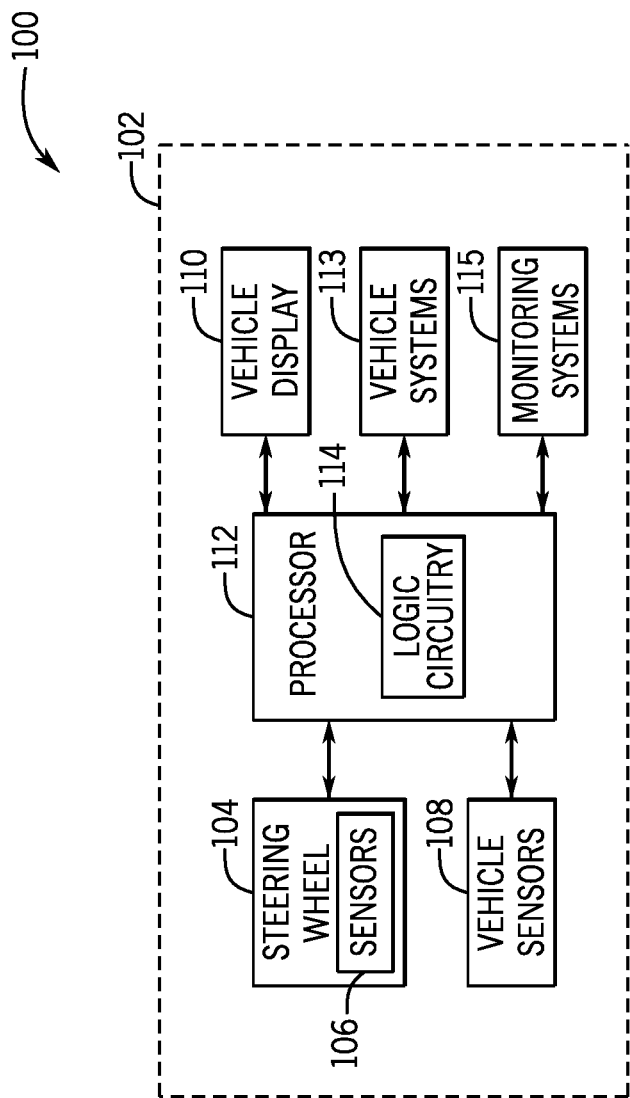
FIG. 1A is a block diagram of an exemplary operating environment for implementing systems and methods for controlling one or more vehicle systems in a vehicle and/or one or more functions associated with a vehicle display in the vehicle while the vehicle is moving according to an embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "steering wheel," as used herein, can also be referred to as a touch steering wheel or a touch steering wheel system. The steering wheel can include various components and devices for providing information about contact with or on the steering wheel. For example, information about contact between a driver's hands (e.g., a left hand, a right hand) and/or other body parts (e.g., knee, thigh, wrist, arm, etc.) and the steering wheel. The steering wheel can include various type of sensors including, but not limited to, capacitive sensors, resistance sensors, piezoelectric touch sensors, pressure sensors, temperature sensors, biometric sensors, infrared light sensors, and camera-based sensors, which can be integrated on or within the steering wheel. In some embodiments, camera-based sensors can be mounted within the vehicle and/or mounted on the steering wheel to capture images including the steering wheel (e.g., images of contact with the steering wheel). The sensors are configured to measure contact of the hands (and/or body parts) of the driver with the steering wheel and a location of the contact. The sensors can be located on the front and back of the steering wheel to determine if the hands are in contact with the front and/or back of the steering wheel (e.g., gripped and wrapped around the steering wheel). In further embodiments, the steering wheel can be communicatively coupled to a sensor board and/or include one or more electrodes for capacitive touch sensing over a range of frequencies (e.g., Swept Frequency Capacitive Sensing).

The steering wheel can measure the surface area, force and/or pressure of the contact of the hands on the steering wheel. In further embodiments, the steering wheel system can provide information and/or monitor movement of hands on the touch steering wheel. For example, the steering wheel can provide information on a transition of hand movements or a transition in the number of hands or other body parts in contact with the steering wheel (e.g., two hands on the steering wheel to one hand on the steering wheel; two hands on the steering wheel to one hand and one knee on the steering wheel; one hand on the steering wheel to two hands on the steering wheel). In some embodiments, a time component can be provided with the transition in hand contact, for example, a time period between the switch from two hands on the steering wheel to one hand on the touch steering wheel. In some embodiments, the touch steering wheel can include sensors to measure a biological parameter of the driver (e.g., physiological information). For example, biological parameters can include heart rate, among others.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow warning, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A "vehicle sensor," as used herein can include, but is not limited to, any sensor used in any vehicle system for detecting a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

I. System Overview

Referring now to the drawings, wherein the showings are for purposes of illustrating one or more exemplary embodiments and not for purposes of limiting the same, FIG. 1A is a schematic diagram of an exemplary operating environment 100 for implementing systems and methods for controlling a vehicle display and/or vehicle systems in a vehicle according to an embodiment. In some embodiments discussed herein, the environment 100 can also be implemented with methods and systems for determining a driver state. The components of the environment 100, as well as the components of other systems, hardware architectures, and software architectures discussed herein, can be combined, omitted, or organized into different architectures for various embodiments.

The environment 100 shown in FIG. 1 can be part of a vehicle 102 and can include a steering wheel 104, steering wheel sensors 106 (e.g., a plurality of sensors of the steering wheel 104), vehicle sensors 108, a vehicle display 110, vehicle systems 113, and monitoring systems 115. The vehicle sensors 108 of the vehicle 102 can include various sensors that can be part of the vehicle systems 113 of the vehicle 102. Although the vehicle sensors 108 and the vehicle systems 113 are shown as separate components in FIG. 1A, it is understood the vehicle sensors 108 can be components of the vehicle systems 113. Further, it is understood that the steering wheel 104 and the steering wheel sensors 106 can be one of the vehicle systems 113 (e.g., a touch steering wheel system). The environment 100 can also include a processor 112 with logic circuitry 114. As described above, the processor 112 with the logic circuitry 114 can include hardware, firmware, and software architecture frameworks (e.g., kernels, libraries, drivers, APIs) for facilitating data processing with the components of the environment 100. In some embodiments, the processor 112 and/or the vehicle 102 can include other computing components not shown in FIG. 1A, for example, a memory, a disk, a bus, among others. In some embodiments, the processor 112 can be a part of the vehicle display 110.

The vehicle systems 113 can include, but are not limited to, any automatic or manual systems that can be used to enhance the vehicle, driving, and/or safety. The vehicle systems 113 can include the vehicle sensors 108 for sensing and measuring a stimulus (e.g., a signal, a property, a measurement, a quantity) associated with the vehicle 102 and/or a particular vehicle system. In some embodiments, the processor 112 can communicate and obtain data representing the stimulus from the vehicle sensors 108 and/or the vehicle systems 113. This data can included and/or be processed into vehicle information.

Vehicle information includes information related to the vehicle 102 of FIG. 1A and/or the vehicle systems 113. Specifically, vehicle information can include vehicle and/or vehicle system conditions, states, statuses, behaviors, and information about the external environment of the vehicle (e.g., other vehicles, pedestrians, objects, road conditions, weather conditions). Exemplary vehicle information includes, but is not limited to, acceleration information, velocity information, steering information, lane departure information, blind spot monitoring information, braking information, collision warning information, navigation information, collision mitigation information and cruise control information.

It is understood that the vehicle sensors 108 can include, but are not limited to, vehicle system sensors of the vehicle systems 113 and other vehicle sensors associated with the vehicle 102. For example, other vehicle sensors can include cameras mounted to the interior or exterior of the vehicle, radar and laser sensors mounted to the exterior of the vehicle, external cameras, radar and laser sensors (e.g., on other vehicles in a vehicle-to-vehicle network, street cameras, surveillance cameras). The sensors can be any type of sensor, for example, acoustic, electric, environmental, optical, imaging, light, pressure, force, thermal, temperature, proximity, among others.

Generally, the monitoring systems 115, as used herein, can include any system configured to provide monitoring information related to the vehicle 102, a driver (FIG. 1B) of the vehicle 102, and/or the vehicle systems 113. More particularly, these monitoring systems ascertain, retrieve and/or obtain information about a driver, for example, information about a driver state or information to assess a driver state. Monitoring systems can include, but are not limited to, optical devices, thermal devices, autonomic monitoring devices as well as any other kinds of devices, sensors or systems. More specifically, monitoring systems can include vehicular monitoring systems, physiological monitoring systems, behavioral monitoring systems, related sensors, among other systems and sensors (not shown). Further, monitoring information can include physiological information, behavioral information, and vehicle information, among others.

It will be understood that in certain embodiments, the vehicle systems 113 and the monitoring systems 115 can be used alone or in combination for receiving monitoring information. In some cases, monitoring information could be received directly from the vehicle systems 113, rather than from a system or component designed for monitoring a driver state. In some cases, monitoring information could be received from both the vehicle systems 113 and the monitoring systems 115. Accordingly, the monitoring systems 115 can include the vehicle systems 113.

It will be understood that each of the monitoring systems 115 discussed herein could be associated with one or more sensors or other devices. In some cases, the sensors could be disposed in one or more portions of the vehicle 102. For example, as will be discussed with FIG. 2, the sensors could be integrated into a dashboard, seat, seat belt, door, dashboard, steering wheel 104, center console, roof or any other portion of the vehicle 102. In other cases, however, the sensors could be portable sensors worn by a driver, integrated into a portable device carried by the driver, integrated into an article of clothing worn by the driver or integrated into the body of the driver (e.g. an implant).

Generally, data from the steering wheel 104 (i.e., data indicating contact with the steering wheel 104 as sensed by the steering wheel sensors 106 and vehicle data from the vehicle sensors 108 can be used by the processor 112 to control interaction with the vehicle display 110, modifying control of vehicle systems 113, and in some embodiments discussed herein, determining a driver state. For example, contact data and vehicle data can be used to enable or disable interaction with the vehicle display 110. More specifically, one or more functions associated with the vehicle display 110 can be enabled or disabled thereby affecting interaction with the one or more functions (e.g., by a driver and/or a non-driving passenger) in the vehicle 102. In other embodiments discussed herein, contact data and vehicle data can be used to control, the vehicle systems 113, and functions associated with the vehicle systems 113.

Figure 1B:
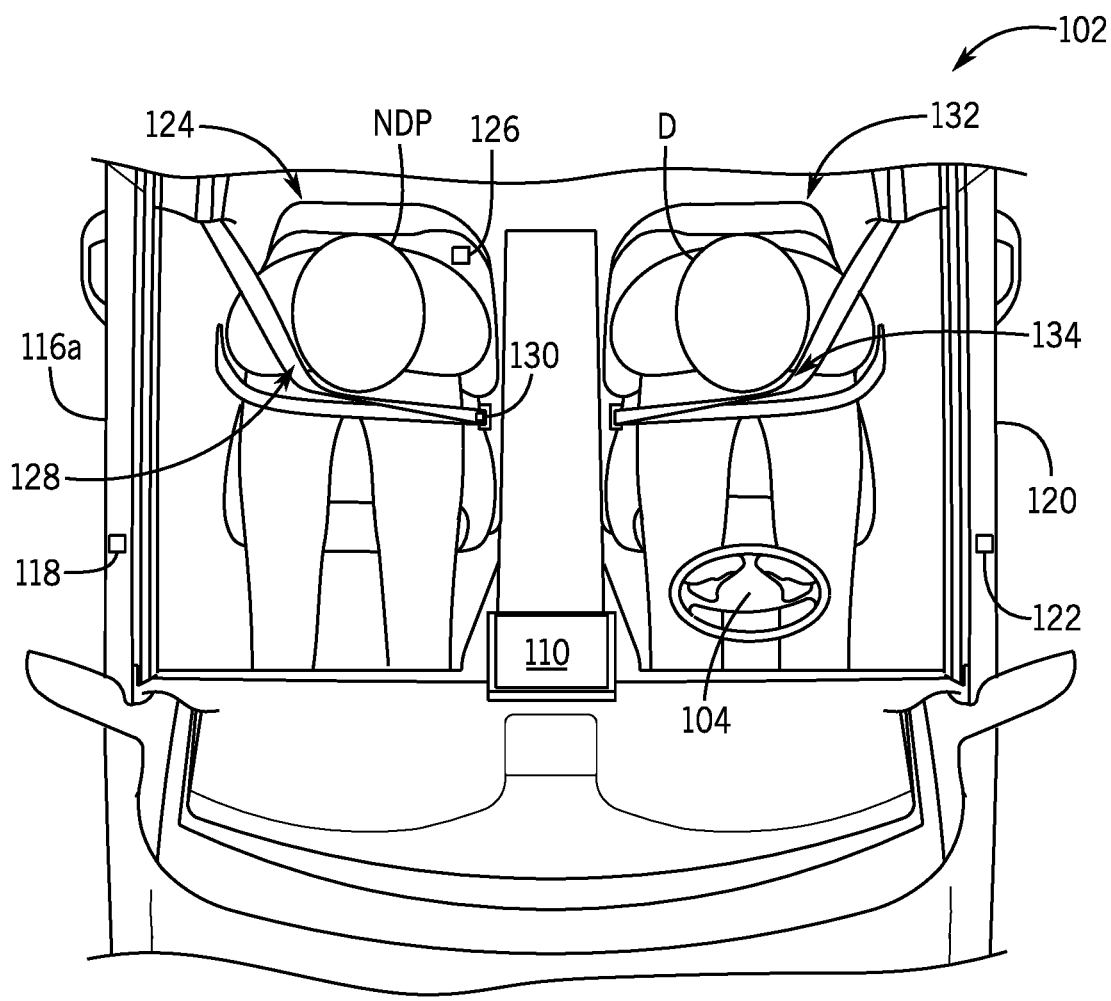
FIG. 1B is a schematic diagram of the vehicle of FIG. 1A according to an exemplary embodiment.

The components of FIG. 1A will now be discussed in more detail with reference to FIGS. 1B and 1C. As mentioned above, the components of FIG. 1A can be part of the vehicle 102, which is shown schematically in FIG. 1B. The vehicle 102 shown in FIG. 1B is a partial schematic view and the vehicle 102 can include other components not shown in FIG. 1B (e.g., other vehicle systems, vehicle sensors, vehicle components). It is understood that in some embodiments, the components of FIG. 1B can be included as part of one or more monitoring systems 115, for example, a passenger monitoring system, a driver monitoring system. In the embodiment shown in FIG. 1B, the vehicle 102 can include a non-driving passenger vehicle door 116 including a non-driving passenger vehicle door sensor 118. The non-driving passenger vehicle door sensor 118 can provide data indicating whether the non-driving passenger vehicle door 116 is open, closed, or in another position (e.g., partially open). Further, the non-driving passenger vehicle door sensor 118 can provide data indicating a non-driving passenger vehicle door 116 open and close sequence (e.g., a time sequence of when the non-driving passenger vehicle door 116 was opened and closed or vice versa). Further, the vehicle 102 includes a driver vehicle door 120 including a driver vehicle door sensor 122. The driver vehicle door sensor 122 can provide data indicating whether the driver vehicle door 120 is open or closed, or in another position (e.g., partially open). Further, the driver vehicle door sensor 122 can provide data indicating a driver vehicle door 120 open and close sequence (e.g., a time sequence of when the driver vehicle door 120 was opened and closed or vice versa).

As shown in FIG. 1B a non-driving passenger NDP and a driver D are present in the vehicle 102. The NDP is positioned in a non-driving passenger seat 124. The non-driving passenger seat 124 can include one or more seat sensors, for example, a non-driving passenger seat sensor 126. In some embodiments, the non-driving passenger seat sensor 126 can be a pressure sensor, a weight sensor, a camera-based sensor, a biometric sensor, or a capacitive based occupant detection system, such as a system described in U.S. Pat. No. 6,424,268, which is incorporated herein by reference. The non-driving passenger seat sensor 126 may be used to detect whether the NDP is present in the vehicle 102 (e.g., seated in the non-driving passenger seat 124). In some embodiments, the non-driving passenger seat sensor 126 can detect the difference between a child passenger, an adult passenger, and a heavy non-human object in the seat 124. In FIG. 1B, the non-driving passenger seat sensor 126 is shown in an upper portion of the non-driving passenger seat 124, however, the non-driving passenger seat sensor 126 can be positioned and configured in various ways not shown in FIG. 1B, such as in the lower portion of the non-driving passenger seat 124.

Further, the NDP in FIG. 1B is shown wearing a non-driving passenger seat belt 128, including a sash portion, a lap portion and a fastener. The non-driving passenger seat belt 128 can include a non-driving passenger seat belt usage sensor 130. The non-driving passenger seat belt usage sensor 130, as shown in FIG. 1B, can be located in the fastener of the non-driving passenger seat belt 128. Thus, the non-driving passenger seat belt usage sensor 130 can be used to determine if the NDP is present in the vehicle 102 (e.g., seated in the non-driving passenger seat 124) and wearing the non-driving passenger seat belt 128 by indicating whether the non-driving passenger seat belt 128 is fastened (e.g., locked). In other embodiments, the non-driving passenger seat belt usage sensor 130 can be positioned and configured in different ways not shown in FIG. 1B. In some embodiments, the non-driving passenger vehicle door sensor 118, the non-driving passenger seat sensor 126, and the non-driving passenger seat belt usage sensor 130 can collectively be a part of a passenger detection system of the vehicle 102.

Further, in FIG. 1B, the driver D is seated in a driver seat 132 and the driver D is wearing a driver seat belt 134. Although not shown in FIG. 1B, the driver seat 132 can include a seat sensor, similar to the non-driving passenger seat sensor 126, and the driver seat belt 134 can include a seat belt usage sensor, similar to the non-driving passenger seat belt usage sensor 130.

In FIG. 1B, the vehicle display 110 is shown located centrally between the driver D and the NDP, for example, at a center console or center of a dashboard of the vehicle 102. However, in other embodiments, the vehicle display 110 can be located in different positions and the vehicle display 110 can include more than one display. The vehicle display 110, as described above, can be integrated within the vehicle 102 or a portable device (not shown) in the vehicle 102 with input (e.g., touch input, keyboard input) and output capabilities. The vehicle display 110 is shown schematically in more detail in FIG. 1C. As shown in FIG. 1C, the vehicle display 110 includes an interface 136 that can receive input and display output. For example, the interface 136 can be a touch screen interface that receives input via touch input from the driver D and/or the NDP to control the vehicle display 110 and/or the vehicle 102. The vehicle display 110 can also include physical input devices, for example, a rotary knob 138 and buttons 140a, 140b. The physical input devices can be used to receive input from the driver D and/or the NDP to control the vehicle display 110 and/or the vehicle 102. Further, in some embodiments, the vehicle display 110 can receive audio input (e.g., via a microphone, not shown) and output audio (e.g., via a speaker, not shown).

The vehicle display 110 can be associated with one or more functions to control the vehicle display 110 and/or control a function of the vehicle 102. For example, the one or more functions can include, but are not limited to: display navigation functions, display input functions, vehicle control functions, among others. The driver D and/or the NDP can interact with the vehicle display 110 using these functions. In FIG. 1C, the vehicle display 110 includes different soft buttons, which can be associated with one or more functions to control the vehicle display 110 and/or a function of the vehicle 102. For example, the interface 136 includes high level soft buttons 142a-142e for display navigation functions, specifically, for changing the interface 136 (e.g., to a different interface/screen). In FIG. 1C, the high level soft buttons 142a-142e are static on the interface 136. Upon interaction with the high level soft buttons 142a-142e, a portion of the interface 136 (e.g., a portion 144 of the interface 136) can change and other functions associated with the high level soft buttons 142a-142e can be displayed.

Figure 1C:
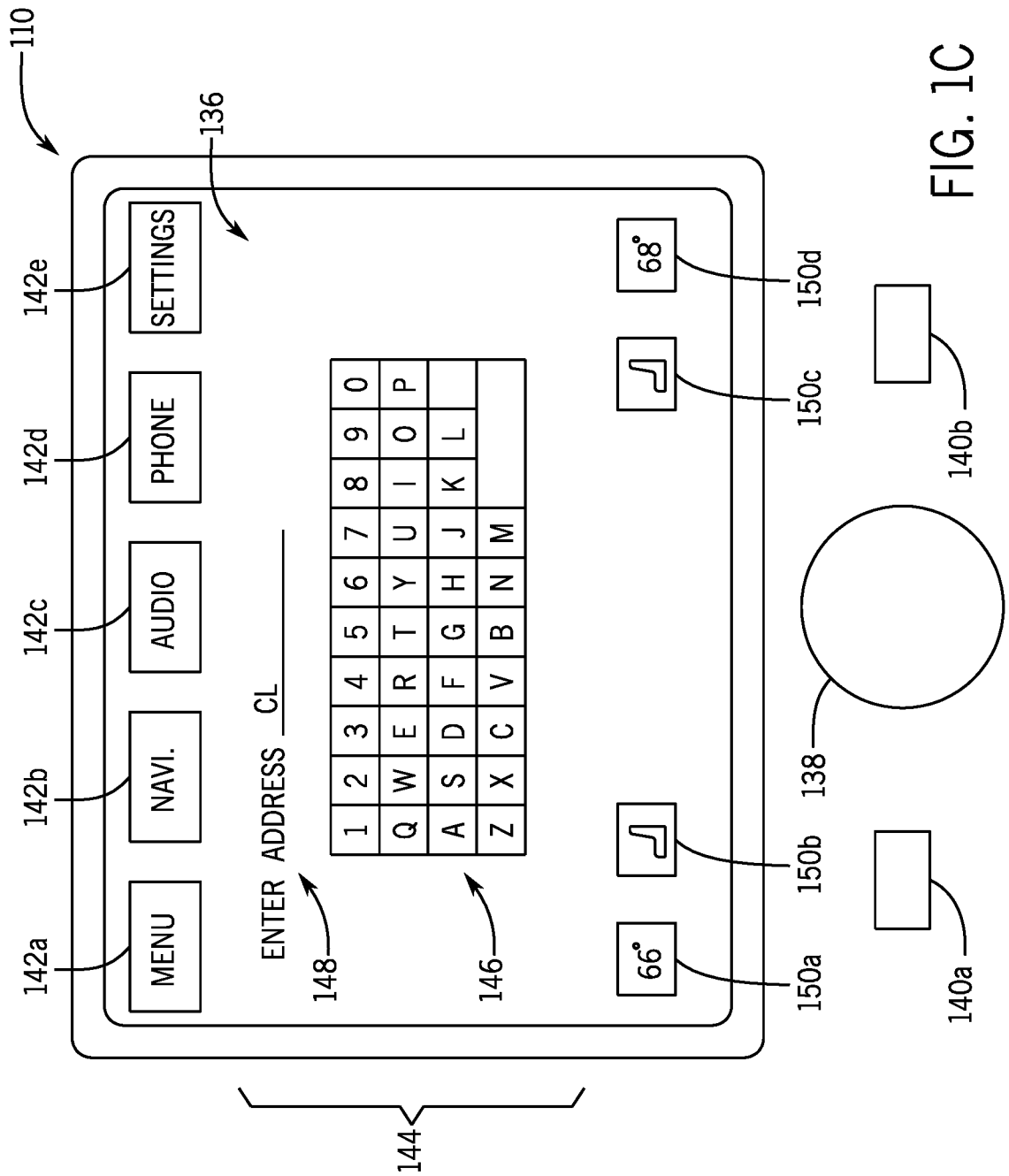
FIG. 1C is a schematic diagram of the vehicle display of FIGS. 1B and 1C according to an exemplary embodiment.

In FIG. 1C, the high level soft buttons include a menu soft button 142a, a navigation soft button 142b, an audio soft button 142c, a phone soft button 142d, and a settings soft button 142e. When the driver D interacts with the menu soft button 142a (e.g., via a touch input or "tap"), the interface 136 (e.g., the portion 144) can change to a main menu interface. When the driver D interacts with the navigation soft button 142b, the interface 136 can change to a navigation interface, which is shown in FIG. 1C. Specifically, a navigation interface is shown within the portion 144. The navigation interface includes functions that facilitate entry of a destination on the vehicle display 110. For example, in FIG. 1C, keyboard soft buttons 146 to enter characters (e.g., via touch) to form a destination address or point of interest input 148.

Referring again to the high level soft buttons 142a-142e, when the driver D interacts with the audio soft button 142c, the interface 136 can change to an audio interface (e.g., radio tuner, song selector, presets, settings, stored music lists). When the driver D interacts with the phone soft button 142d, the interface 136 can change to a phone interface to initiate a phone call (e.g., a contact listing, a dial touchpad). When the driver D interacts with the settings button 142e, the interface 136 can change to a listing of stored settings to control the vehicle display 110 and/or the vehicle 102.

Further, as mentioned above, the interface 136 can include soft buttons to control vehicle systems of the vehicle 102. For example, in FIG. 1C, climate control soft buttons 150a-150d are shown for controlling functions of a climate control system (not shown) of the vehicle 102. Specifically, a driver cabin temperature soft button 150a, a driver seat heater soft button 150b, a passenger seat heater soft button 150c, and a passenger cabin temperature soft button 150d. When the driver D interacts (e.g., via touch input or "tap") with the driver cabin temperature soft button 150a, the interface 136 displays a driver cabin temperature control to change the heating or cooling of the area around the driver D (e.g., a +/− soft button to increase or decrease the temperature by an amount of degrees). The driver seat heater soft button 150b can enable or disable (or adjust a level) of heat within the driver seat. Similar functions can be implemented on the passenger side with the passenger seat heater soft button 150c and the passenger cabin temperature soft button 150d. In other embodiments not shown in FIG. 1C, other vehicle and display functions and configurations can be provided by the vehicle display 110 on the interface 136.

In one embodiment, each of the one or more functions associated with the vehicle display 110 can be assigned a workload value based on the difficulty of interacting with the function. In some embodiments, the processor 112 can assign a workload value to each of the one or more functions associated with the vehicle display 110. The workload values can be stored at the processor 112.

In some embodiments, a function can be assigned a high workload value or a low workload value. A function that requires high attention, several steps, detailed input, several touch inputs (e.g., several taps) and/or a long duration of interaction, can have a high workload value. Further, functions that control certain vehicle systems can have a high workload value. Functions with a high workload value can potentially be distracting to the driver D when the vehicle 102 is moving. As an illustrative example, the function of the keyboard soft button 146 can be assigned a high workload value since typing input requires high attention and several steps that can take a long period of time. As another illustrative example, scrolling through a list of more than ten destination addresses or points of interest (not shown) for the destination address or point of interest input 148 can be assigned a high workload value since scrolling through a long list can take a long period of time. As a further illustrative example, the function of the settings soft button 142e can be assigned a high workload value since changing the vehicle settings can require several steps or require high attention (e.g., reading the various setting behaviors before choosing a selection). As a yet further illustrative example, searching through a list of songs, artists or albums in the function of the audio soft button 142c can be assigned a high workload value since scrolling through the list requires several steps and high attention. As a still yet further illustrative example, the pairing of a phone through Bluetooth connection in the function of the phone soft button 142d can be assigned a high workload value since it may require using the phone interface or similar high attention steps.

Conversely, a function that requires little attention, one or two steps, one touch input, or a short duration of interaction, can have a low workload value. A driver can be less distracted when interacting with a function assigned a low workload value. As an illustrative example, a high-level function, for example, switching to a menu screen using the menu soft button 142a can be assigned a low workload value since interaction with this function only requires a one touch input. Similarly, the function of the driver cabin temperature button 150a or the driver seat heater soft button 150b can be assigned a low workload value since interaction with this function (i.e., to change the temperature or to turn the heater on or off) requires a short touch inputs.

Based on the above, the processor 112 can disable or enable different functions of the vehicle display 110 based on contact data, the vehicle data and/or a workload value assigned to the function. This can ensure appropriate functions are available for the driver D and/or the NDP while the vehicle 102 is moving. For example, if the NDP is not present in the vehicle 102, one or more functions associated with the vehicle display 110 can be set to disabled (e.g., grayed out, hidden, cannot be selected/operated) and therefore the driver D cannot interact (e.g., touch, select, control) with the disabled function. However, if an NDP is present, the contact data indicates both hands of the driver D hands are in contact with the steering wheel 104, and the contact data meets specific requirements, one or more functions associated with the vehicle display 110 can be set to enabled (e.g., shown, can be selected/operated) and therefore the NDP can interact (e.g., touch, select, control) with the enabled function. The systems and methods to implement such control, including the configuration of the steering wheel 104, will now be discussed in detail.

II. Steering Wheel Configuration

Figure 2:
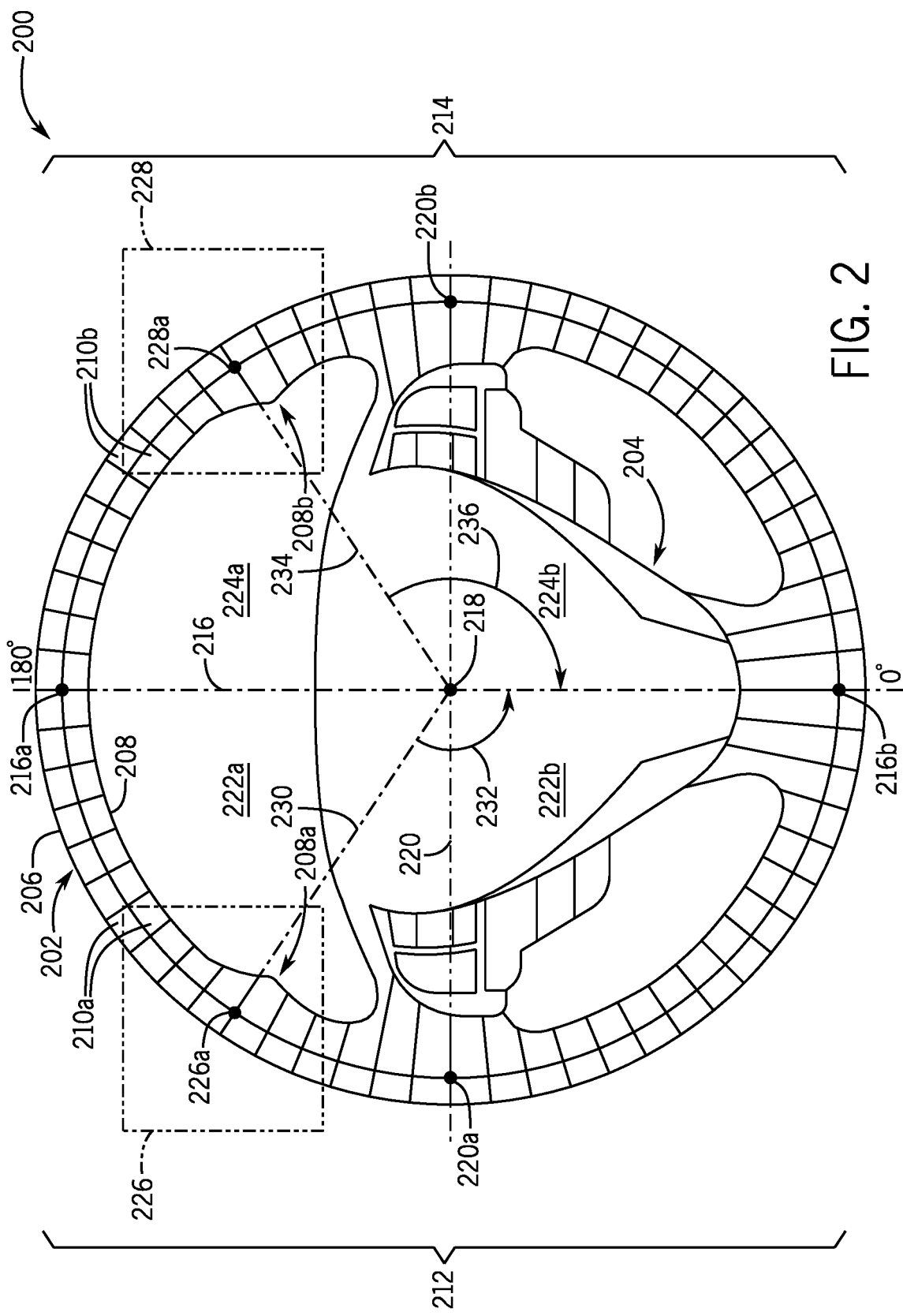
FIG. 2 is a schematic diagram of the steering wheel of FIGS. 1A and 1B according an exemplary embodiment.

As discussed above, the steering wheel 104 can be a touch steering wheel or a touch steering wheel system. The steering wheel sensors 106 can detect contact with the steering wheel 104, for example, contact of hands and/or other body parts with the steering wheel 104. The steering wheel 104 and the steering wheel sensors 106 will now be discussed in more detail with reference to a steering wheel 200 shown in FIG. 2. The steering wheel 200 in FIG. 2 is circular in shape and includes a rim 202 and a center portion 204. The center portion 204 is connected to the rim 202. The rim 202 also has an outer periphery 206 and an inner periphery 208. Although not shown in FIG. 2, the rim 202 includes a front surface and a back surface. In other embodiments, the steering wheel 200, the rim 202, and the center portion 204 can have shapes, sizes, and configurations different than those shown in FIG. 2. For example, the rim 202 can have a different contour along different portions of the rim 202. As shown in FIG. 2, the inner periphery 208 of the rim 202 includes a contour point 208a and a contour point 208b, where the rim 202 has slight curve and protrudes towards the center portion 204 of the steering wheel 200. In some embodiments, the contour point 208a and the contour point 208b can be omitted from the steering wheel 200. In other embodiments, other shapes of the rim 202 and other contour points not shown in FIG. 2 can be implemented.

The steering wheel 200 includes a plurality of sensors (e.g., steering wheel sensors 106) and the steering wheel 200 has a left zone and a right zone. In FIG. 2, a plurality of sensors 210a, 210b are shown. Further, the steering wheel 200 is divided into two portions, namely, a left zone 212 and a right zone 214. The plurality of sensors 210a, 210b are configured to sense contact on or with the steering wheel 200. As shown in FIG. 2, the plurality of sensors 210a, 210b are integrated into the rim 202 in a grid-like configuration. However, the plurality of sensors 210a, 210b can also be integrated on the entire surface of the steering wheel 200, for example, on the center portion 204. The plurality of sensors 210a, 210b can also be integrated with the rim 202 to cover the entire surface of the rim 202, including front and back surfaces of the rim 202. In some embodiments, the plurality of sensors 210a, 210b can be positioned in configurations other than the grid-like configuration shown in FIG. 2. For example, in one embodiment, the steering wheel 200 can include two sensors: a first capacitive sensor within and/or covering the left zone 212 and a second capacitive sensor within and/or covering the right zone 214. In another embodiment, the back surface of the rim 202 could be a third capacitive sensor, in addition to the left zone 212 front surface and the right zone 214 front surface.

In another embodiment, the steering wheel 200 can include one zone or more than two zones (e.g., the left zone 212 and the right zone 214). For example, in one embodiment, the steering wheel 200 includes one zone (not shown) that encompasses the left zone 212 and the right zone 214. In this embodiment, the steering wheel 200 can include an electrode (not shown) and/or be communicatively coupled to a sensor board (not shown) for capacitive touch sensing over a range of frequencies (e.g., Swept Frequency Capacitive Sensing). In this embodiment, multiple contacts with the steering wheel 200 can be determined based on measuring multiple data points at different frequencies. Thus, a posture of a contact (e.g., a configuration of the hands) can be determined.

It is understood that each of the plurality of sensors 210a, 210b can be sensors of different types, sizes and configurations. For example, the plurality of sensors 210a, 210b can be capacitive sensors, resistance sensors, piezoelectric touch sensors, pressure sensors, temperature sensors, biological sensors, infrared light sensors, camera-based sensors, and a combination of different types of sensors, among others. Other configurations and numbers of sensors can be implemented in other embodiments.

With respect to the portions of the steering wheel 200, the left zone 212 and the right zone 214 are defined by a vertical planar line 216 that runs from a point 216a to a point 216b and is perpendicular to a center point 218 of the steering wheel 200. In some embodiments, the center point 218 of the steering wheel 200 is an axis of rotation of the steering wheel 200. The left zone 212 includes the surface areas (front and back) of the steering wheel 200 extending to the left from the center point 218. Similarly, the right zone 214 includes the surface areas (front and back) of the steering wheel 200 extending to the right from the center point 218. In FIG. 2, the left zone 212 and the right zone 214 are symmetrical, however, in some embodiments, the left zone 212 and the right zone 214 can be asymmetrical. In other embodiments, the vertical planar line 216 does not have to be vertical and could be tilted left or right at various angles.

In some embodiments, the steering wheel 200 can be further divided into quadrants based on the vertical planar line 216 that is perpendicular to the center point 218 and a horizontal planar line 220, which runs from point 220a to 220b, the horizontal planar line 220 perpendicular to the center point 218. This creates quadrants within the left zone 212 and the right zone 214 defined by the intersection of the vertical planar line 216 and the horizontal planar line 220 with the center point 218. Specifically, a first left zone quadrant 222a, a second left zone quadrant 222b, a first right zone quadrant 224a, and a second right zone quadrant 224b are created. In some embodiments, an "upper half" of the steering wheel 200 as used herein includes the first left zone quadrant 222a and the first right zone quadrant 224a. Said differently, an upper half of the steering wheel 200 includes areas of the steering wheel 200 located in a positive y-axis direction from the intersection of the vertical planar line 216 and the horizontal planar line 220 (e.g., from the center point 218). Consequently, a "lower half" of the steering wheel 200 as used herein includes the second left zone quadrant 222b and the second right zone quadrant 224b. Said differently, a lower half of the steering wheel 200 includes areas of the steering wheel 200 located in a negative y-axis direction from the intersection of the vertical planar line 216 and the horizontal planar line 220 (e.g., from the center point 218).

In FIG. 2, the vertical planar line 216 and the center point 218 of the steering wheel 200 create two coordinate systems, one coordinate system for the left zone 212 and one coordinate system for the right zone 214. In FIG. 2, the left zone 212 is defined by a 180° coordinate system and the right zone 214 is defined by a 180° coordinate system. Specifically, the coordinate system defining the left zone 212 in FIG. 2 is defined as 180° at point 216a and 0° at point 216b in relation to an angle extending to the left (i.e., towards the point 220a) from the center point 218 of the steering wheel 200. The coordinate system defining the right zone 214 in FIG. 2 is defined as 180° at point 216a and 0° at point 216b in relation to an angle extending to the right (i.e., towards the point 220b) from the center point 218 of the steering wheel 200.

In other embodiments, the coordinate system can originate at different points. Further, in other embodiments, a single 360° coordinate system can be used based on the center point 218 of the steering wheel 200. In some embodiments, other coordinate values (e.g., non-degree values) can be used, for example, non-discrete values (e.g., 1, 2, and 3), Cartesian coordinates, or discrete values (e.g., "10 o'clock," "high", "middle"). Further, as mentioned above, a discrete value such as "upper half" and "lower half" can be used. The values of the coordinate system can be converted to other values for calculations as discussed herein. The coordinate system can be used to determine a position on the steering wheel 200, for example, a position of a contact surface area and/or a position of contact with the steering wheel 200.

As mentioned above, the plurality of sensors 210a, 210b are configured to sense contact on or with the steering wheel 200. Specifically, as will be discussed herein, the plurality of sensors 210a, 210b are configured to sense contact within the left zone 212 and contact within the right zone 214. More specifically, the plurality of sensors 210a, 210b are configured to sense contact of a left hand and/or other body part within the left zone 212 and to sense contact of a right hand and/or other body part within the right zone 214. A hand and/or other body part, in some embodiments can include wrists, elbows, shoulders, knees, thighs, and arms, among others.

The plurality of sensors 210a, 210b transmit signals indicating contact on or with the steering wheel 200. These signals can be converted to contact values (e.g., non-discrete values, discrete values) for evaluation to determine if the driver D has two hands on the steering wheel 200. In one embodiment, the contact values are capacitance values based on signals from a first capacitive sensor within the left zone 212 and signals from a second capacitive sensor within the right zone 214. These contact values (e.g., capacitance values), can provide an indication of contact with the steering wheel 200 on a contact surface area within the left zone 212 and a contact surface area within the right zone 214. In another embodiment, the contact values are pressure values based on signals from a first pressure sensor within the left zone 212 and signals from a second pressure sensor within the right zone 214. In some embodiments, pressure values are expressed as a unit of pressure measurement (e.g., pascal (Pa) or kilopascal (kPa)). These contact values (e.g., pressure values), can provide an indication of pressure (e.g., strength) of the contact with the steering wheel 200 on a contact surface area within the left zone 212 and a contact surface area within the right zone 214.

Each of these contact surface areas are located at a particular position on the steering wheel 200 with respect to the center point 218 of the steering wheel 200 and the coordinate systems discussed above. In particular, the contact surface areas maximize contact of a left hand and a right hand on or with the steering wheel 200. The contact surface area can be maximized to allow for different hand sizes. The contact surface area encourages and/or forces a particular hand posture and a particular pressure to ensure the driver D is attentive and in control of the vehicle 102. Further, threshold values can be determined based on these contact surface areas and the contact values can be evaluated with the threshold values to determine if the driver D has two hands on the steering wheel 200. Stated differently, the threshold values are determined based on a surface area amount within each zone.

Surface area, as discussed herein, includes the sum of all the areas of all the shapes of the steering wheel 200 that cover the surface of the steering wheel 200. The surface area can also include a contour, or a shape. Accordingly, contact surface area, as described herein, is a surface area of the steering wheel 200 for contact by the left or right hand of the driver. The contact surface area can have a contour, or a shape, and has a position on the steering wheel 200. The contact surface area, as discussed above, is an area on the surface of the steering wheel 200 that maximizes contact of a hand on the steering wheel 200. The position of this contact surface area and the contour of this contact surface area are factors that maximize contact of a hand, in other words, provides a contact surface area that allows for the most direct contact between the hand and the steering wheel. Further, this contact surface area provides for maximum grip (e.g., hand posture) and maximum pressure with the steering wheel 200. It is understood that the contact surface areas maximize contact of an average left hand of an adult and an average right hand of an adult. Further, the other factors, for example, grip, pressure, and posture are based on values of an average adult (e.g., an average adult left hand grip, an average adult right hand grip).

Figure 3A:
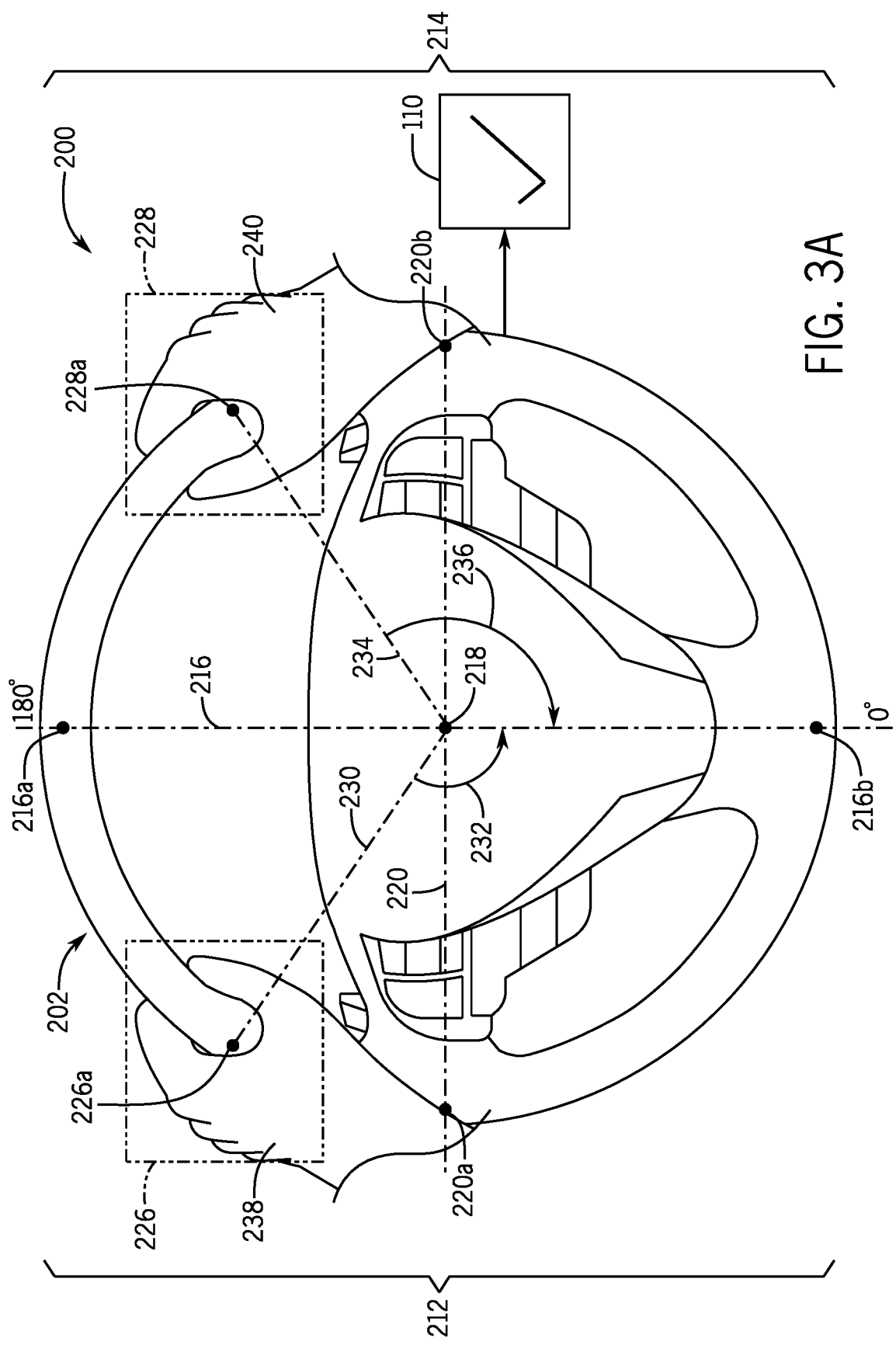
FIG. 3A is a schematic diagram of the exemplary steering wheel of FIG. 2 showing a left hand and a right hand according to an embodiment.

In FIG. 2, two exemplary contact surface areas are shown that maximize contact of a hand on or with the steering wheel 200. A left contact surface area 226 is shown having a center point 226a on the rim 202 within the left zone 212, and more specifically, the first left zone quadrant 222a. Further, a right contact surface area 228 is shown having a center point 228a on the rim 202 within the right zone 214, and more specifically, the first right zone quadrant 224a. The left contact surface area 226 and the right contact surface area 228 provide for maximum contact with a left hand 238 and a right hand 240 respectively as shown in FIG. 3A. In FIG. 3A, the left contact surface area 226 allows a left hand 238 to grip the steering wheel 200 with a particular posture to allow for maximum contact of the left hand 238 with the steering wheel 200. Other surface areas on the steering wheel 200 may not maximize contact with a driver's hand. For example, a contact surface area centered on the point 220a cannot provide maximum contact surface area as compared to the left contact surface area 226 because of the contour of the center portion 204 as it joins the rim 202 near the point 220a. For example, in this area, the driver D could not fully grip the steering wheel 200 in contrast to the left contact surface area 226.

As mentioned above, the contact surface areas have a position on the steering wheel 200. For example, the left contact surface area 226 is positioned at an angle between the center point 218 and the vertical planar line 216 within the left zone 212. This position can be expressed using the coordinate system discussed above. For example, a line 230 extending from the center point 218 to the center point 226a has an angle 232 approximately 120°. In some embodiments, depending on the coordinate system utilized, the left contact surface area 226 is positioned at a 10 o'clock position. Further, in some embodiments, the left contact surface area 226 is in an upper half of the steering wheel 200.

Similarly, the right contact surface area 228 is positioned at an angle between the center point 218 and the vertical planar line 216 within the right zone 214. This position can be expressed using the coordinate system discussed above. For example, in FIG. 2, a line 234 extending from the center point 218 to the center point 228a has an angle 236 approximately 120°. In some embodiments, depending on the coordinate system utilized, the right contact surface area 228 is positioned at a 2 o'clock position. Further, in some embodiments, the right contact surface area 228 is in an upper half of the steering wheel 200.

III. Methods for Controlling a Vehicle Display in a Vehicle

Figure 4:
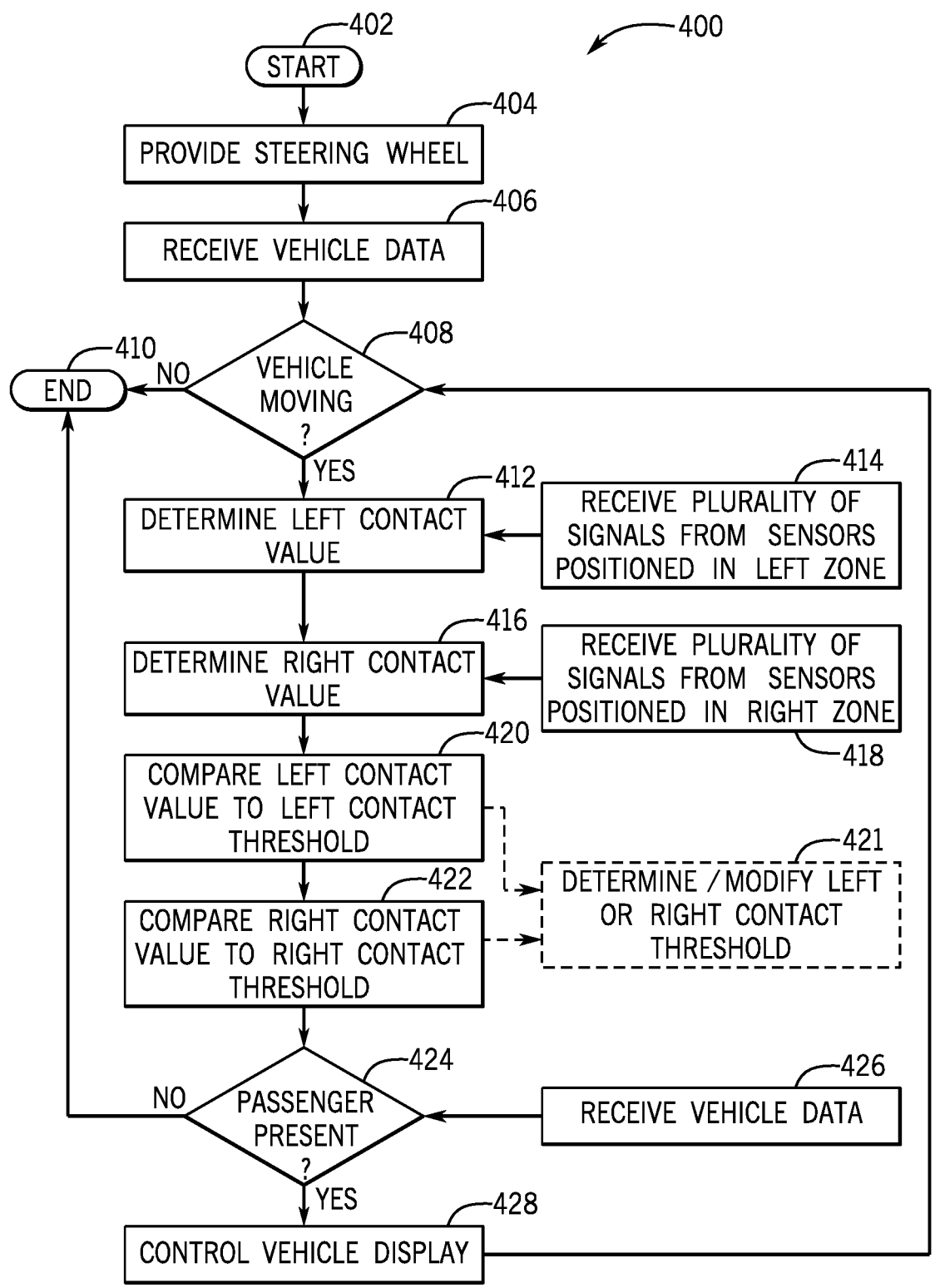
FIG. 4 is a flow diagram of an exemplary method for controlling a vehicle display in a vehicle while the vehicle is moving according to an embodiment.
Figure 5:
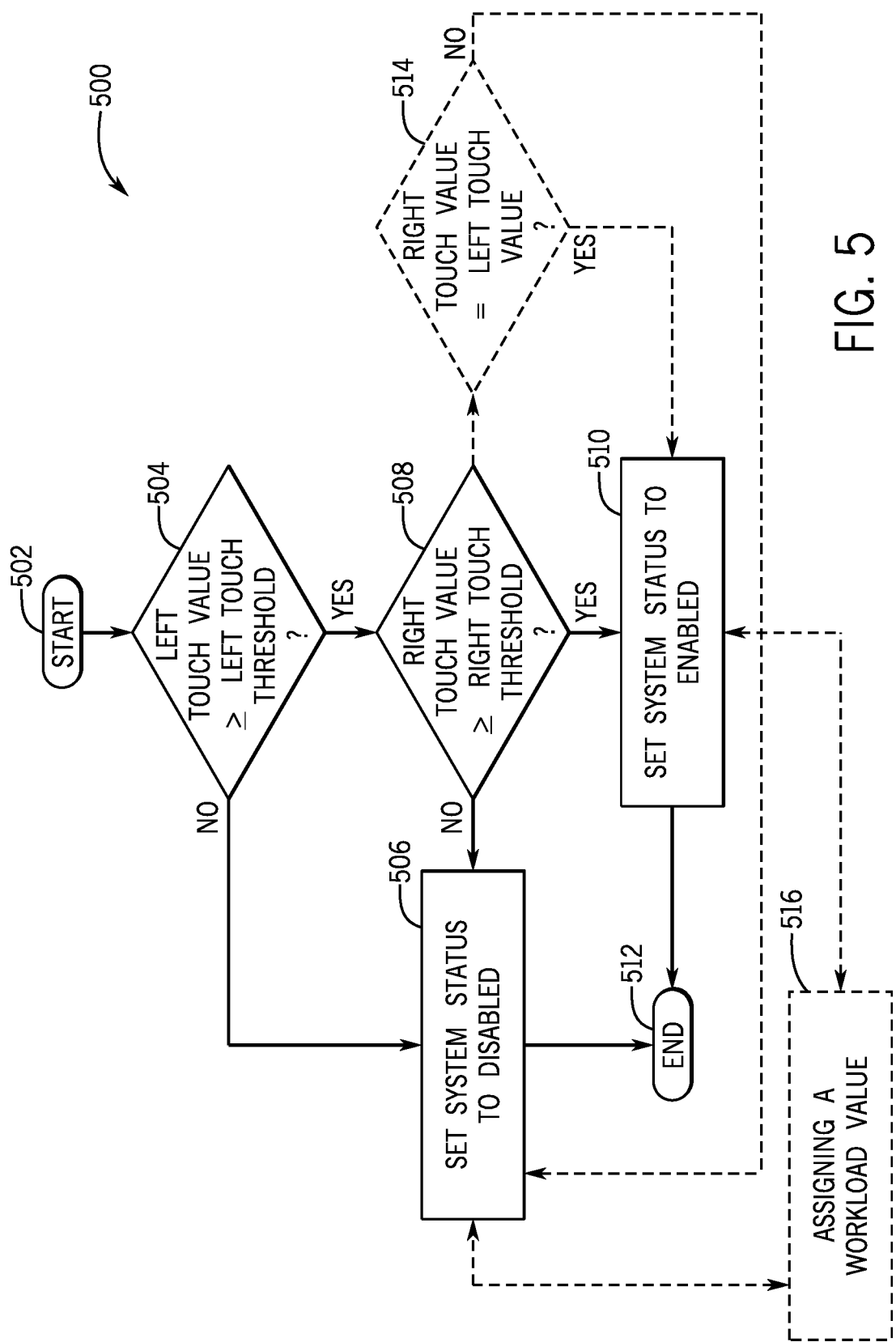
FIG. 5 is a flow diagram of an exemplary method for comparing the left contact value and the right contact value according to an embodiment.

The components of FIGS. 1A, 1B, 1C and the steering wheel 200 of FIG. 2 will now be described in more detail with exemplary methods shown in FIGS. 4 and 5. Further, these methods will be described with respect to the illustrative examples shown in FIGS. 3A, 3B, and 3C. For simplicity, the elements and configuration of the components of FIGS. 1A, 1B, 1C and 2 will be used throughout the description. Although the methods discussed with FIGS. 4 and 5 refer to control of the vehicle display 110, as will be discussed herein, these methods can also be implemented to control the vehicle systems 113, as will be discussed herein in Section VI. Referring now to FIG. 4, the method 400 starts at block 402 and includes at block 404, providing a steering wheel 200 having a plurality of sensors 210a, 210b configured to sense contact on the steering wheel 200. As discussed in detail about with FIG. 2, the steering wheel 200 has a left zone 212 and a right zone 214. The left zone 212 and the right zone 214 are defined by a vertical planar line 216 perpendicular to a center point 218 of the steering wheel 200. The steering wheel 200 has a plurality of sensors 210a, 210b configured to sense contact on the steering wheel 200. In one embodiment, the steering wheel 200 has two sensors (not shown): a first capacitive sensor located within the left zone 212 and a second capacitive sensor located within the right zone 214.

A vehicle display 110 is operatively connected for computer communication to the steering wheel 200 and the vehicle 102. The vehicle 102 can include vehicle sensors 108 for acquiring vehicle data. Thus, as shown in FIG. 1A, the steering wheel 104 is operatively connected for computer communication to the vehicle 102, the vehicle sensors 108, the vehicle display 110, and the processor 112. Accordingly, in some embodiments, the vehicle display 110 can include the processor 112 and/or the processor 112 can be part of another vehicle component, for example, an ECU.

Referring again to FIG. 4, at block 406, the method 400 includes receiving vehicle data from the vehicle sensors 108. The processor 112 can receive the vehicle data and determine, at block 408, if the vehicle 102 is moving based on the vehicle data. For example, the vehicle data can include speed data about the vehicle 102 from, for example, acceleration sensors, speed sensors and/or GPS (e.g., the vehicle sensors 108). In some embodiments, the determination of whether the vehicle 102 is moving includes whether the vehicle 102 is moving at a particular speed (e.g., the vehicle 102 can be moving at a low speed rather than stationary). In other embodiments, the determination of whether the vehicle 102 is moving includes whether the vehicle 102 is in park or in gear. Thus, in one embodiment, if the speed data indicates a speed under 10 kilometers per hour, the processor 112 can determine that the vehicle is not moving (NO). In another embodiment, if the vehicle 102 is in park, the processor 112 can determine that the vehicle is not moving (NO). If the determination at block 408 is NO, the method 400 ends at block 410. However, if the determination at block 408 is YES, the method proceeds to block 412. In one embodiment, the method 400 continues while the vehicle 102 is moving. More specifically, while block 408 is determined to be YES (i.e., TRUE), the method 400 processes a loop from block 412 to block 428.

At block 412, the method 400 includes determining a left contact value. The left contact value indicates a contact (e.g., of a left hand) with the steering wheel 200 within the left zone 212. The left contact value is based on one or more signals received from the one or more sensors (e.g., the steering wheel sensors 106, the plurality of sensors 210a, 210b) at block 414. More specifically, in one embodiment, the method 400 can include receiving one or more signals from one or more of the sensors positioned in the left zone 212 of the steering wheel 200. Thus, the processor 112 receives one or more signals from one or more of the sensors 210a, 210b and determines a left contact value based on the one or more signals. In another embodiment, one or more signals can be received from a first capacitive sensor (not shown) positioned in the left zone 212. In this embodiment, the left contact value determined at block 412 is based on data (e.g., signals) from a single sensor, the first capacitive sensor positioned in the left zone 212.

Referring again to the embodiment of receiving one or more signals from one or more sensors 210a, 210b positioned in the left zone 212, determining the left contact value based on the one or more signals includes identifying a set of a plurality of signals received from at least one of the plurality of sensors that are positioned within the left zone 212 of the steering wheel 200 and calculating the left contact value based on the set of the plurality of signals. For example, the processor 112 can selectively identify which sensors of the plurality of sensors 210a, 210b are positioned in the left zone 212. For example, the processor 112 can selectively identify sensors 210a are positioned in the left zone 212. Therefore, the processor 112 can selectively identify and/or receive one or more of the signals from the identified sensors, 210a. Stated differently, the processor 112 can selectively receive a set of a plurality of signals from one or more sensors positioned in the left zone 212 (e.g., the plurality of sensors 210a) and the processor 112 determines the left contact value based on the set of the plurality of signals. Accordingly, the left contact value indicates contact with or on the steering wheel 200 within the left zone 212. For example, and with reference to FIG. 3A, the left contact value can indicate contact between the left hand 238 and the rim 202 of the steering wheel 200. In another embodiment, the processor 112 can selectively identify which sensors of the plurality of sensors 210a, 210b are positioned in the left contact surface area 226.

Similarly, and with reference to FIG. 4, at block 416 the method 400 can include determining a right contact value. The right contact value indicates a contact (e.g., of a right hand) with the steering wheel 200 within the right zone 214. The right contact value can be based on one or more signals received from one or more sensors (e.g., the steering wheel sensors 106, the plurality of sensors 210a, 210b) at block 418. More specifically, in one embodiment, the method 400 receiving one or more signals from one or more sensors positioned in the right zone 214 of the steering wheel 200. Thus, the processor 112 receives one or more signals from the one or more sensors 210a, 210b and determines a right contact value based on the one or more signals. In another embodiment, one or more signals can be received from a second capacitive sensor (not shown) positioned in the right zone 214. In this embodiment, the right contact value determined at block 416 is based on data (e.g., signals) from a single sensor, the second capacitive sensor positioned in the right zone 214.

Referring again to the embodiment including receiving one or more signals from one or more sensors 210a, 210b positioned in the right zone 214, determining the right contact value based on the one or more signals includes identifying a set of a plurality of signals received from at least one of the plurality of sensors 210a, 210b that are positioned within the right zone 214 of the steering wheel 200 and calculating the right contact value based on the set of the plurality of signals. The processor 112 can selectively identify which sensors of the plurality of sensors 210a, 210b are positioned in the right zone 214. For example, the processor 112 can selectively identify sensors 210b are positioned in the right zone 214. Therefore, the processor 112 can selectively identify and/or receive one or more of the signals from the identified sensors, 210b. Stated differently, the processor 112 can selectively receive a set of a plurality of signals from one or more sensors positioned in the right zone 214 (e.g., the plurality of sensors 210b) and the processor 112 can determine the right contact value based on the set of the plurality of signals. Accordingly, the right contact value indicates contact with or on the steering wheel 200 within the right zone 214. For example, and with reference to FIG. 3A, the right contact value can indicate contact between the right hand 240 and the rim 202 of the steering wheel 200. In another embodiment, the processor 112 can selectively identify which sensors of the plurality of sensors 210a, 210b are positioned in the right contact surface area 228.

The contact values (e.g., left contact value, right contact value) can be a numeric value converted from one or more of the signals. The contact values indicate information about the contact in the left zone 212 and the right zone 214. The contact values can be an aggregated value of different types of information about the contact. Different types of information can include size of the contact, pressure of the contact, location of the contact, among others. In other embodiments, the contact value can include a plurality of contact values each indicating a different type of contact information.

With respect to capacitive sensors, typically a low contact value is produced if the contact size is small (e.g., contact of a single average adult finger) and a larger contact value is produced if the contact size is large (e.g., contact of an average adult palm of a hand). However, the contact value can also be low if there is an overlay or a separation between the steering wheel 200 and the hand. For example, a glove on a hand would produce a lower value since the glove is a non-conductive material and increases separation between the steering wheel 200 and the hand. As another example, if a hand is holding an object (such as a phone, cup, or food) while holding the steering wheel 200, the contact value produced is lower. A contact value could also be higher based on pressure applied to the steering wheel 200 (e.g., a strong grip).

Referring again to FIG. 4, the method 400 includes at block 420 comparing the left contact value to a left contact threshold. Thus, in one embodiment, the processor 112 compares the left contact value to the left contact threshold. The left contact threshold may be determined based on a left contact surface area of the steering wheel within the left zone 212. Accordingly, the method can also include at block 421 determining and/or modifying the left contact threshold. The processor 112 can, in one embodiment, determine the left contact threshold based on the left contact surface area 226 of the steering wheel 200 within the left zone 212, for example, at block 421. In another embodiment, the processor 112 can determine the left contact threshold based on the left contact surface area 226 of the steering wheel 200 within the left zone 212 and a contour (e.g., contour point 208a) of the left contact surface area 226.

The left contact surface area 226 maximizes the contact of the left hand 238 with the steering wheel 200 within the left zone 212. Stated differently, the left contact threshold is based on a contact surface area (e.g., the left contact surface area 226) that provides enough contact for an average adult left hand. The left contact surface area 226 is at a specific position based on the coordinate system discussed above. Specifically, the left contact surface area 226 is positioned at a predetermined angle between the center point 218 of the steering wheel 200 and the vertical planar line 216 within the left zone 212. Thus, in FIGS. 2 and 3A, the predetermined angle is angle 232 at approximately 120°, but could be between 100° and 140°. In one embodiment, the left contact threshold may be determined as a function of the left contact surface area 226. In a further embodiment, the left contact threshold is proportional to the left contact surface area 226 of the steering wheel 200 within the left zone 212. Block 420 will be discussed in further detail herein with FIG. 5.

As mentioned above, at block 421, the left contact threshold can be determined and/or modified based on different parameters (e.g., vehicle data). In one embodiment, the left contact threshold is a dynamic threshold that can be modified based on environmental conditions. For example, in one embodiment, the left contact threshold is determined based on an environmental offset value. The environmental offset value can compensate for an environmental condition and/or the type of steering wheel sensor 106. For example, if the steering wheel sensors 106 are capacitive sensors, some environmental conditions, for example, humidity or static can skew the reading from the capacitive sensors. Thus, the environmental offset value can be based on the vehicle data received from the vehicle sensors 108 (e.g., received at block 406). For example, the vehicle sensors 108 can include environmental sensors that detect information about the environment inside the vehicle 102 or surrounding the vehicle 102. Environmental sensors for detecting an environmental condition can include, but are not limited to, temperature sensors, humidity sensors, barometric pressure sensors, wind speed sensors, wind direction sensors, solar radiation sensors, and vision sensors. Thus, an environmental offset value can be used to increase or decrease the left contact threshold based on humidity, temperature, among others.

In another example, the environmental offset can be based on the material that covers the steering wheel 200. Typically, the steering wheel 200 is covered in a material, for example, microfiber or leather. This material can affect the operation and/or readings from the steering wheel sensors 106 based on the type of material, the thickness of the material, the wear and/or the degradation of the material. Accordingly, in one embodiment, the environmental offset can be predetermined and stored at the vehicle 102 based on the material and/or thickness of the material covering the steering wheel 200. In another embodiment, the processor 112 can determine the wear or degradation of the material based on, for example, the number of ignition ON/OFF cycles during the life cycle of the vehicle 102. In other embodiments, a vision sensor (e.g., interior camera sensor) can determine the wear of the material.

In yet another example, the environmental offset can be based on the steering wheel sensors 106 themselves. For example, the steering wheel sensors 106 can sense the degradation in their signals over time. A constant can be stored in memory (e.g., of the processor 112). The constant can signify the original sensor contact value when no hands are touching the steering wheel 200 when the steering wheel sensors 106 were newly installed in the vehicle 102 (e.g., zero). As the steering wheel sensors 106 degrade over time, the sensor contact value when no hands are touching the steering wheel 200 will change (e.g., zero plus or minus small amounts). This value can be periodically compared to the constant stored in memory and adjustments can be made to the steering wheel sensors 106 to bring the sensor contact value back to the original value (e.g., zero).

In a further embodiment, at block 421, the method 400 can include modifying the left contact threshold based on hand size data previously stored at the vehicle 102. In some embodiments, the left contact threshold can be based on an average left hand size of an average adult. In other embodiments, the left contact threshold can be based on the size of the left hand of the driver D. This information can be stored at the vehicle 102, for example, at the processor 112 and/or the logic circuitry 114. For example, the size of the left hand of the driver D can be manually input and stored at the vehicle 102. In another embodiment, the size of the left hand of the driver D can be learned and stored based on vehicle data received from vehicle sensors 108.

Referring again to FIG. 4 and similar to block 420, the method 400 also includes at block 422, comparing the right contact value to a right contact threshold. Thus, in one embodiment, the processor 112 compares the right contact value to the right contact threshold. The right contact threshold may be determined based on a right contact surface area of the steering wheel 200 within the right zone 214. In another embodiment, a right contact threshold may be determined based on a right contact surface area of the steering wheel 200 within the right zone 214 and a contour of the right contact surface area. The processor 112 can, in one embodiment, determine the right contact threshold based on the right contact surface area 228 of the steering wheel 200 within the right zone 214. In another embodiment, the processor can determine the right contact threshold based on the right contact surface area 228 of the steering wheel 200 within the right zone 214 and a contour (e.g., contour point 208*b*) of the right contact surface area 228.

As mentioned above, the right contact surface area 228 maximizes the contact of the right hand 240 with the steering wheel 200 within the right zone 214. Stated differently, the right contact threshold is based on a contact surface area (e.g., the right contact surface area 228) that provides enough contact for an average adult right hand. The right contact surface area 228 is at a specific position based on the coordinate system discussed above. Specifically, the right contact surface area 228 is positioned at a predetermined angle between the center point 218 of the steering wheel 200 and the vertical planar line 216 within the right zone 214. Thus, in FIGS. 2 and 3A, the predetermined angle is angle 236 at approximately 120°, but could be between 100° and 140°. In one embodiment, the right contact threshold is determined as a function of the right contact surface area 228. In a further embodiment, the right contact threshold is proportional to the right contact surface area 228 of the steering wheel 200 within the right zone 214. In another embodiment, the right contact threshold is proportional to the right contact surface area 228 of the steering wheel 200 within the right zone 214 and the contour (e.g., the contour point 208*b*) of the right contact surface area 228. Block 422 will be discussed in further detail herein with FIG. 5.

Similar to the discussion of the left contact threshold above, at block 421, the right contact threshold can be determined and/or modified based on different parameters (e.g., vehicle data). For example, in one embodiment, the right contact threshold is determined based on an environmental offset value, the environmental offset value indicating an environmental condition and the environmental offset value based on the vehicle data received from the vehicle sensors 108. Further, in another embodiment, the right contact threshold can be modified based on hand size data (e.g., right hand size of the driver D) previously stored at the vehicle 102. The other embodiments, discussed above with the left contact threshold can also be implemented with the right contact threshold.

Further, the method 400 of FIG. 4 includes at block 424 determining if a non-driving passenger (NDP) is present in the vehicle 102. In one embodiment, to determine if the NDP is present in the vehicle 102, vehicle data can be received by the vehicle sensors 108 at block 426. Block 426 can also be performed prior to block 424, for example, with block 408 based on the vehicle data received at block 406. As discussed above with FIGS. 1A and 1B, the vehicle sensors 108 can include sensors configured to receive data that can be evaluated to determine whether the NDP is present in the vehicle 102. For example, the vehicle sensors 108 can include the non-driving passenger vehicle door sensor 118, the non-driving passenger seat sensor 126, and the non-driving passenger seat belt usage sensor 130 as shown in FIG. 1B. The non-driving passenger vehicle door sensor 118, the non-driving passenger seat sensor 126, and the non-driving passenger seat belt usage sensor 130 can be part of a passenger detection system of the vehicle 102.

Accordingly, in one example, the processor 112 can receive vehicle data from the non-driving passenger vehicle door sensor 118 to determine a non-driving passenger vehicle door 116 open and close sequence. For example, the vehicle data from the non-driving passenger vehicle door sensor 118 can indicate whether the non-driving passenger vehicle door 116 was opened (i.e., from the outside of the vehicle 102) and then closed (i.e., from the inside of the vehicle 102) in a sequence. This open and close sequence can indicate a NDP is present in the vehicle 102. In another embodiment, vehicle data from the non-driving passenger seat sensor 126 can be used alone and/or in combination with other vehicle data (e.g., data from the non-driving passenger vehicle door sensor 118) to determine if a NDP is present in the vehicle 102. In one embodiment, the non-driving passenger seat sensor 126 is a weight, a capacitance and/or a pressure sensor. The value received from the non-driving passenger seat sensor 126 can be compared to thresholds to determine if a NDP is present in the vehicle 102 and/or if the NDP is an adult. Thus, in one embodiment, the processor 112 compares the vehicle data received from the non-driving passenger seat sensor 126 to a predetermined threshold, for example, a predetermined weight threshold for deploying an air bag (not shown), to determine if the NDP is present in the vehicle and/or the NDP is an adult.

In another embodiment, vehicle data from the non-driving passenger seat belt usage sensor 130 can be used alone and/or in combination with other vehicle data (e.g., data from the non-driving passenger vehicle door sensor 118, the non-driving passenger seat sensor 126) to determine if a NDP is present in the vehicle 102. For example, the non-driving passenger seat belt usage sensor 130 as shown in FIG. 1B, is located in the fastener of the non-driving passenger seat belt 128. Thus, the vehicle data from the non-driving passenger seat belt usage sensor 130 can indicate whether the NDP is using the non-driving passenger seat belt 128 (e.g., the non-driving passenger seat belt 128 is fastened or not). Thus, in this embodiment, determining the NDP is present in the vehicle 102 includes determining if the non-driving passenger seat belt 128 is being worn by the NDP on the vehicle data.

If the determination at block 424 is NO, the method 400 ends at block 410. However, upon determining the NDP is present in the vehicle 102 based on vehicle data received from vehicle sensors 108 of the vehicle 102 at block 424 (i.e., YES), the method 400 proceeds to block 428. Block 428 includes controlling one or more functions associated with the vehicle display 110 by setting a system status of the one or more functions associated with the vehicle display 110 to enabled or disabled based on comparing the left contact value to the left contact threshold and comparing the right contact value to the right contact threshold. Thus, the processor 112 can set a system status of the one or more functions associated with the vehicle display 110 to enabled or disabled based on comparing the left contact value to the left contact threshold (e.g., block 420) and comparing the right contact value to the right contact threshold (e.g., block 422).

If the system status is set to enabled, the one or more functions associated with the vehicle display 110 are active (e.g., shown, can be selected/operated) to receive input and interact with the NDP. If the system status is set to disabled, the one or more functions associated with the vehicle display 110 are deactivated (e.g., grayed out, hidden, cannot be selected/operated) and cannot receive input and/or interact with the driver D or the NDP in the vehicle 102. It should be noted that block 424 could be performed prior to block 408 or between block 408 and block 412. Further, blocks 406 and 426 could be combined.

Details of comparing the left and right contact values and controlling the vehicle display 110 (i.e., blocks 420, 422, and 428) will now be discussed with reference to method 500 of FIG. 5. For simplicity, determination of whether a NDP is present in the vehicle (i.e., block 424) has been omitted from FIG. 5, however, a similar block can be incorporated with the method 500. The method 500 beings at block 502 and at block 504, the method 500 includes determining if the left contact value is greater than or equal to the left contact threshold. If the determination is NO, the method 500 proceeds to block 506 where the system status of the one or more functions associated with the vehicle display 110 is set to disabled and the method 500 ends at block 512. Thus, in one embodiment, upon the processor 112 determining that an NDP is present in the vehicle 102 (i.e., block 424) and the processor 112 determines the left contact value is not greater than or equal to the left contact threshold, then the processor 112 sets the system status of the one or more functions of the vehicle display 110 to disabled. In some embodiments, block 504 can include determining if the left contact value is within a predetermined range (e.g., tolerance value) of the left contact threshold. For example, if the left contact value is within five (+/−5) of the left contact threshold. In some embodiments, the predetermined range could be based on an offset value, for example, the environmental offset value discussed herein.

If the determination at block 504 is YES, the method 500 proceeds to block 508 where it is determined if the right contact value is greater than or equal to the right contact threshold. If the determination is NO, the method 500 proceeds to block 506. If the determination is YES, the method proceeds to block 510 where the system status of the one or more functions associated with the vehicle display 110 is set to enabled and the method 500 ends at block 512. Accordingly, in one embodiment, upon the processor 112 determining an NDP is present in the vehicle 102 (i.e., block 424), the left contact value is greater than or equal to the left contact threshold (i.e., block 504), and the right contact value is greater than or equal to the right contact threshold (i.e., block 508), the processor 112 sets the system status of the one or more functions associated with the vehicle display 110 to enabled. In some embodiments, block 508 can include determining if the right contact value is within a predetermined range (e.g., tolerance value) of the right contact threshold. For example, if the right contact value is within five (+/−5) of the right contact threshold. In some embodiments, the predetermined range could be based on an offset value, for example, the environmental offset value discussed herein.

In another embodiment, if the determination at block 508 is YES, the method 500 can proceed to block 514. Here, it is determined if the right contact value is equal to the left contact value. If the determination at block 514 is YES, the method 500 proceeds to block 510. Otherwise, if the determination at block 514 is NO, the method 500 proceeds to block 506. In some embodiments, the determination at block 514 is based on the coordinate system used to determine the position of contact surface area. For example, if the coordinate system is a 360° system, the determination at block 514 can be based on a difference between the right contact value and the left contact value within some tolerance value. Thus, the determination at block 514 can indicate whether the left hand and right hand mirror positions in the left zone 212 and the right zone 214. In some embodiments, the determination at block 514 can be based on the absolute values of the right contact value and the left contact value.

As discussed above with FIG. 1C, each of the one or more functions associated with the vehicle display 110 can be assigned a workload value based on the difficulty of interacting with the function. Thus, in one embodiment, the method 500 of FIG. 5, in particular with blocks 506 or 510, can include assigning a workload value based on a difficulty of interacting with the one or more functions associated with the vehicle display at block 516. In one embodiment, the processor 112 can determine the workload value and the workload value can be stored, for example, at the processor 112. In another embodiment, the workload values can be predetermined and stored.

Accordingly, in one embodiment, upon the processor determining the NDP is present in the vehicle 102, the left contact value meets the left contact threshold (block 504), and the right contact value meets the right contact threshold (block 508), the processor 112 sets the system status of the one or more functions associated with the vehicle display 110 assigned a high workload value (block 516) to enabled. For example, functions such as address or point of interest entry with a keyboard, establishing a Bluetooth connection with a phone, scrolling through a list of addresses, points of interest or songs, or changing vehicle settings may be enabled. In another embodiment, upon the processor determining the NDP is present in the vehicle 102 and either the left contact value does not meet the left contact threshold (block 504) or the right contact value does not meet the right contact threshold (block 508), the processor 112 sets the system status of the one or more functions associated with the vehicle display 110 assigned a high workload value (block 516) to disabled.

IV. Exemplary Control of a Vehicle Display in a Vehicle

Illustrative examples shown in FIGS. 3A, 3B and 3C will now be discussed with reference to FIGS. 1A, 1B, 1C, 2 and FIGS. 4 and 5. For simplicity, the elements and configuration of the steering wheel 200 shown in FIG. 2 will be used throughout the discussion. In FIG. 3A, the left contact threshold is determined based on the left contact surface area 226 and the right contact threshold is determined based on the right contact surface area 228 as discussed above. For purposes of discussion, the left contact threshold is equal to 50 and the right contact threshold is equal to 50. Accordingly, after the left contact value and the right contact value are determined for the contact of the left hand 238 and the right hand 240, the left contact value is compared to the left contact threshold. In the example shown in FIG. 3A, the left hand 238 is in contact with the steering wheel 200 within the left contact surface area 226. The left hand 238 is gripped around the steering wheel 200. Accordingly, in this example, for purposes of discussion, the left contact value is 70. Similarly, the right hand 240 is in contact with the steering wheel 200 within the right contact surface area 228. The right hand 240 is gripped around the steering wheel 200. Accordingly, in this example, for purposes of discussion, the right contact value is 70. Thus, since the left contact value is greater than the left contact threshold and the right contact value is greater than the right contact threshold, the processor 112 can set the system status of the one or more functions associated with the vehicle display 110 to enabled upon determining the NDP is present in the vehicle 102.

Although the left hand 238 is shown fully gripping the steering wheel 200 in FIG. 3A, the left hand 238 could be in another posture, for example simply placing a palm within the left contact surface area 226. This posture would result in a lower left contact value (e.g., lower than 50) since the size of contact is less than the previous example (i.e., left hand 238 fully gripped on steering wheel 200). Accordingly, in this example, since the left contact value does not meet the left contact threshold, the processor 112 can set the system status of the one or more functions associated with the vehicle display 110 to disabled.

Figure 3B:
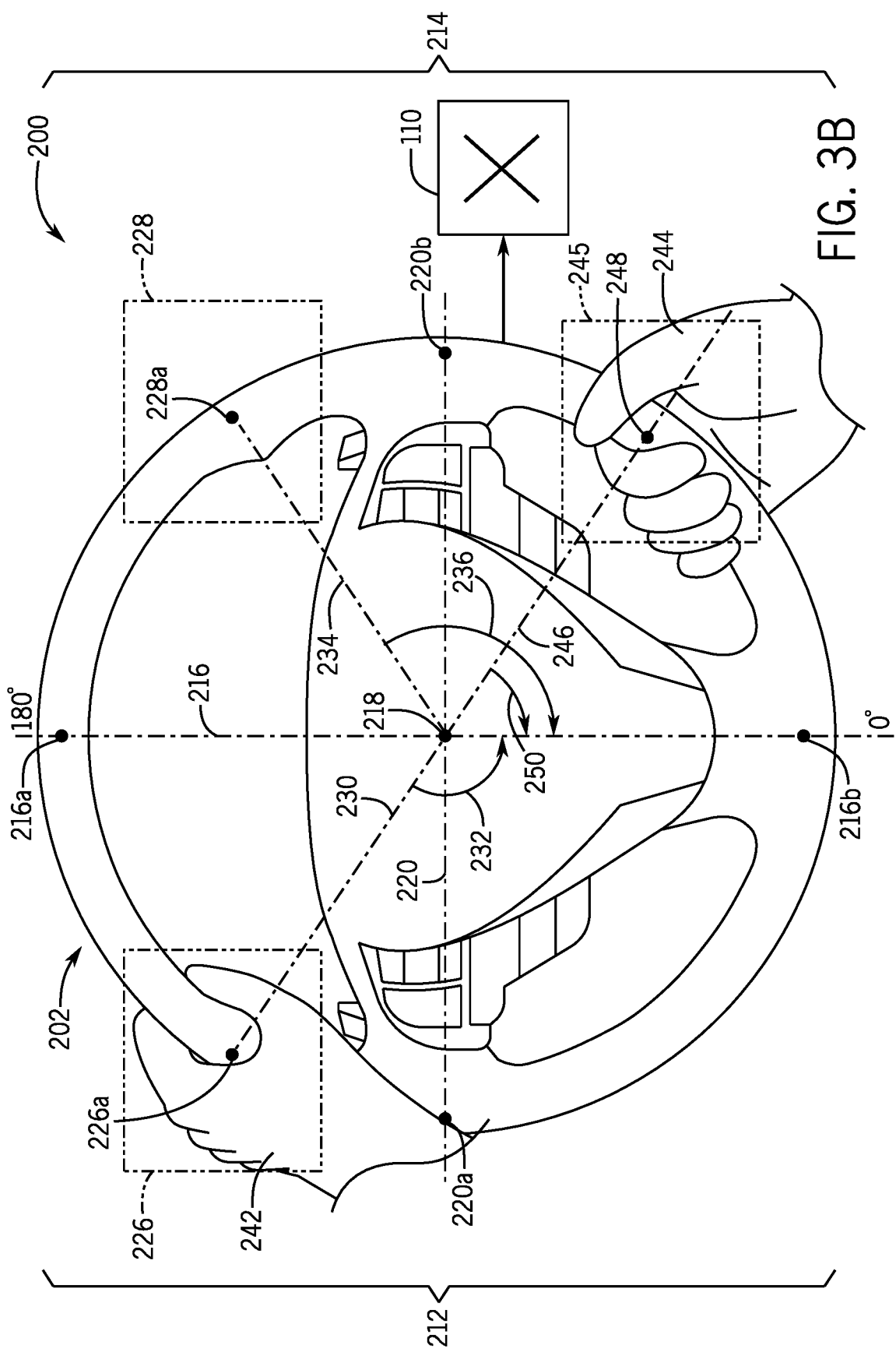
FIG. 3B is a schematic diagram of the exemplary steering wheel of FIG. 2 showing a left hand and a right hand in a different position than that shown in FIG. 3A according to an embodiment.

In FIG. 3B, a left hand 242 is shown in the same position as the left hand 238 in FIG. 3A. However, in contrast to FIG. 3A, a right hand 244 is shown in the right zone 214 in a position lower than the right hand 240 of FIG. 3A. As can be seen in FIG. 3B, the contact surface area 245 where the right hand 244 is in contact with the steering wheel 200 does not maximize contact with the right hand 244. Specifically, at the contact surface area 245, the palm of the right hand 244 is not in contact with the steering wheel 200. In another example, not shown in FIG. 3B, if the right hand 244 gripped the steering wheel with the palm of the right hand 244 facing down, the contact surface area 245 still does not provide maximum contact for the right hand 244 since the contour of the steering wheel 200 in this area may not allow the pinky finger of the right hand 244 to naturally contact the steering wheel 200.

Accordingly, in the example shown in FIG. 3B, the right contact value is lower than the right contact value associated with the right hand 240 in the example shown in FIG. 3A. For purposes of discussion, the right contact value of the right hand 244 for the example shown in FIG. 3B is 30. Thus, in FIG. 3B, since the left contact value is greater than the left contact threshold and the right contact value is less than the right contact threshold, the processor 112 can set the system status of the one or more functions associated with the vehicle display 110 to disabled upon determining the NDP is present in the vehicle 102.

Figure 3C:
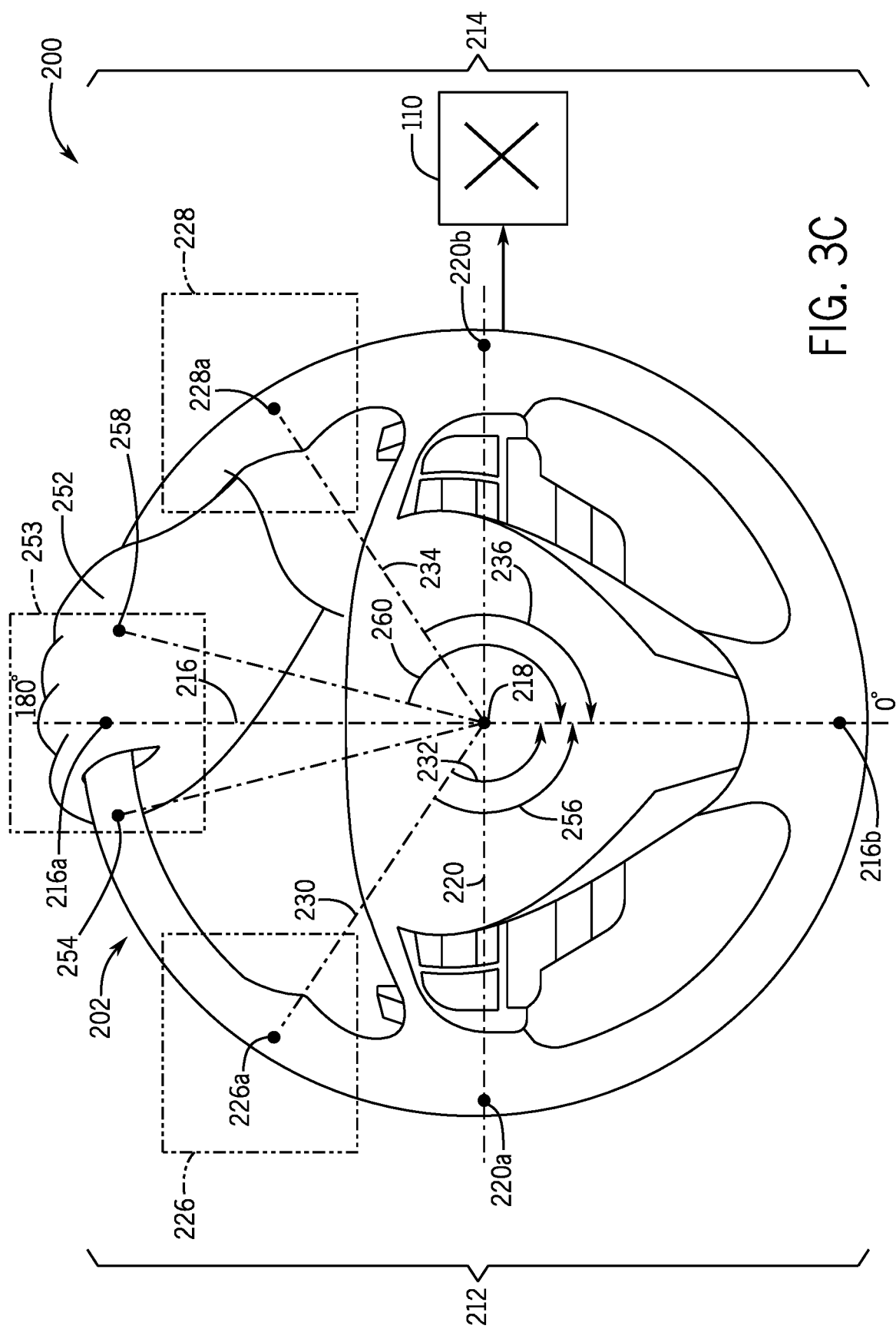
FIG. 3C is a schematic diagram of the exemplary steering wheel of FIG. 2 showing a left hand according to an embodiment.

A further example is shown in FIG. 3C. Here, a right hand 252 is shown positioned about the point 216a and covers a portion of the left zone 212 and the right zone 214 at a contact surface area 253. Specifically, the portion of the right hand 252 within the left zone 212 is positioned in a contact surface area with an angle 256 from a line 258 extending from the center point 218 to a point 254. Thus, the left contact value is low, for example, 10, since only two fingers of the right hand 252 contact the steering wheel 200.

The portion of the right hand 252 within the right zone 214 is positioned in a contact surface area with an angle 262 from a line 264 extending from the center point 218 to a point 260. The right contact value in this example, is slightly higher, for example, 20, since a larger portion of the right hand 252 contacts the steering wheel 200. Thus, since the left contact value does not meet the left contact threshold and the right contact value does not meet the right contact threshold, the processor 112 can set the system status of the one or more functions associated with the vehicle display 110 to disabled upon determining the NDP is present in the vehicle 102

Another method for controlling a vehicle display in a vehicle while the vehicle is moving according to another embodiment will now be discussed with reference to a method 600 shown in FIG. 6. As mentioned above, the contact values (e.g., the left contact value, the right contact value) can be aggregate values and/or a plurality of separate values. Thus, in one embodiment the contact values can be an aggregated value or different types of information about the contact. Accordingly, comparing the left contact value the left contact threshold and comparing the right contact value to the right contact threshold can include a plurality of values and comparisons for each zone of the steering wheel 200.

Figure 6:
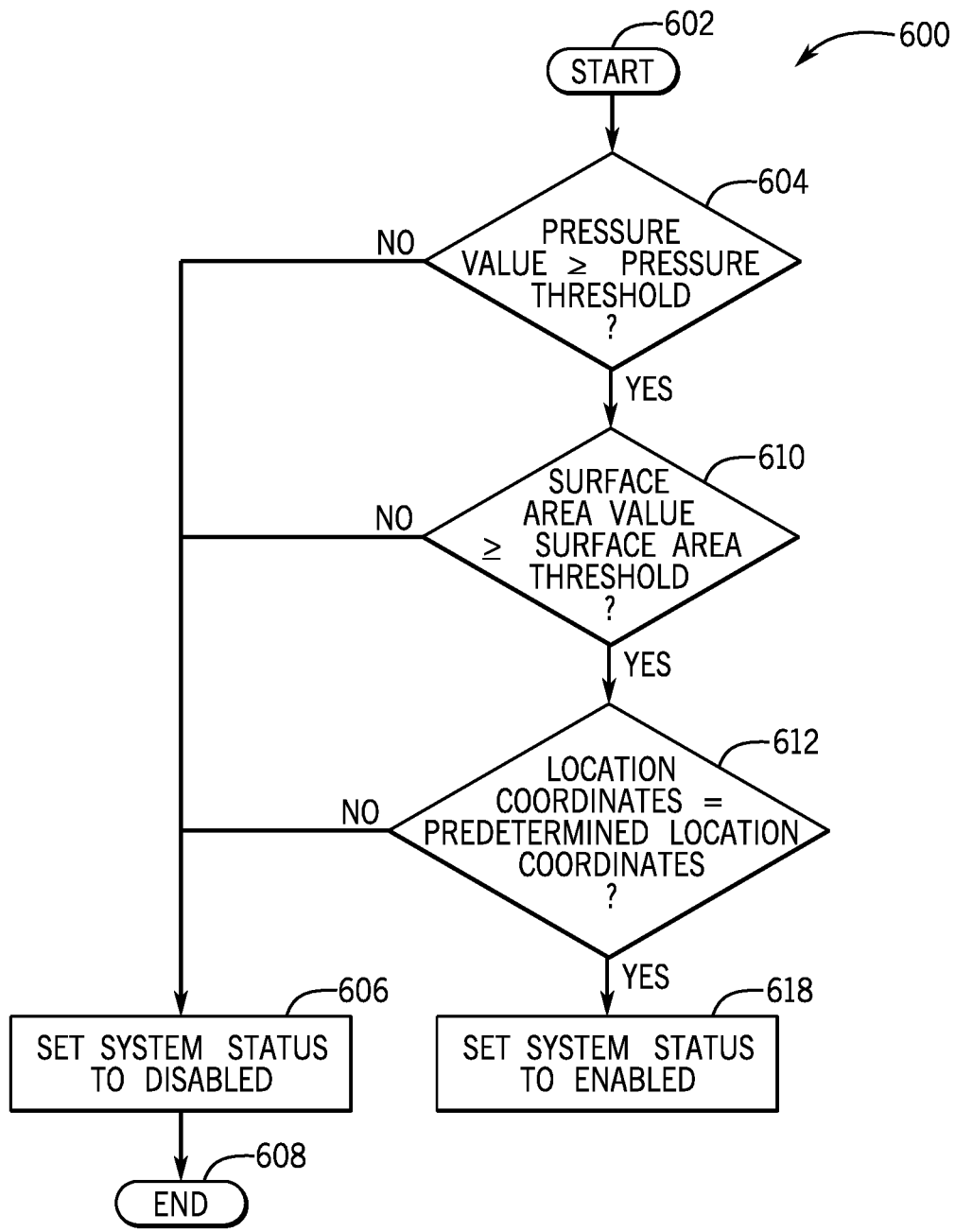
FIG. 6 is a flow diagram of an exemplary method for controlling a vehicle display in a vehicle while the vehicle is moving according to an embodiment.

In FIG. 6, a plurality of contact values are shown as: pressure value, surface area value, and location coordinates. These values can be referred to as a plurality of contact values. Each zone, the left zone 212 and the right zone 214 can produce these values. Thus, in some embodiments, there can be a plurality of left contact values and a plurality of right contact values. Similarly, the contact thresholds can be referred to as a plurality of contact thresholds. In FIG. 6, a plurality of contact thresholds are shown as: a pressure threshold, a surface area threshold and predetermined location coordinates. These thresholds can be specific to the left zone 212 and the right zone 214. Thus, in some embodiments, there can be a plurality of left contact thresholds and a plurality of right contact thresholds.

The method of FIG. 6, illustrates a comparison of each value and threshold to control the one or more functions associated with the vehicle display 110. Although only one iteration for one zone of the steering wheel 200 is discussed herein, the method of FIG. 6 can be iterated for each zone, the left zone 212 and the right zone 214. For simplicity, determination of whether the vehicle 102 is moving and whether a NDP is present in the vehicle (i.e., blocks 408, 424) have been omitted from FIG. 6, however, similar blocks can be incorporated with the method 600.

The method 600 starts at block 602 and at block 604, the method 600 includes determining if the pressure value is greater than or equal to the pressure threshold. The pressure value can be determined based on one or more of the signals received form at least one of the plurality of sensors 210a, 210b. Further, the pressure threshold can be determined based on pressure values of an average adult (e.g., an average adult left hand grip, an average adult right hand grip). As discussed herein, in some embodiments, pressure values and/or pressure thresholds are expressed as a unit of pressure measurement (e.g., pascal (Pa) or kilopascal (kPa)). If the determination at block 604 is NO, the method 600 proceeds to block 606 where the system status of the one or more functions associated with the vehicle display 110 is set to disabled and the method ends at block 608. If YES, the method 600 proceeds to block 610 where it is determined if the surface area value meets the surface area threshold. The surface area value can be determined based on one or more of the signals received form at least one of the plurality of sensors 210a, 210b. Further, the surface area threshold can be determined based on an average adult (e.g., an average adult size, an average adult size). As discussed above, the surface area threshold maximizes contact of an average adult hand on the steering wheel 200.

If the determination at block 610 is NO, the method 600 proceeds to block 606 where the system status of the one or more functions associated with the vehicle display 110 is set to disabled and the method 600 ends at block 608. If YES, the method proceeds to block 612. At block 612, it is determined if the location coordinates meet predetermined location coordinates. The location coordinates of the contact on the steering wheel 200 can be based on one or more signals received from at least one of the plurality of sensors 210a, 210b and the coordinate systems described herein. Further, the predetermined location coordinates can be stored, for example at the processor 112, and can be determined based on, for example, a position on the steering wheel 200 (e.g., a contact surface area) that maximizes contact of an average adult hand on the steering wheel 200. In other embodiments, the predetermined location coordinates can be based on the surface area threshold.

If the determination at block 612 is NO, the method 600 proceeds to block 606 where the system status of the one or more functions associated with the vehicle display 110 is set to disabled and the method 600 ends at block 608. If YES, the method 600 proceeds to block 618 where the system status of the one or more functions associated with the vehicle display 110 is set to enabled and the method ends at block 608. The method 600 can be iterated for each zone of the steering wheel 200, namely, the left zone 212 and the right zone 214. As mentioned above, the methods and examples discussed in Sections III and IV are related to controlling the vehicle display 110. However, similar methods and examples can be implemented with controlling and/or modifying vehicle systems 113.

V. Controlling Vehicle Systems Based on Driver State and/or Vehicular State

As discussed above with reference to FIGS. 1A and 2, the steering wheel sensors 106 can detect contact with the steering wheel 104, for example, contact of hands and/or other body parts with the steering wheel 104, within the left zone 212 and/or the right zone 214. In some embodiments, the contact surface area of a hand and/or other body part on the steering wheel 104 can correlate to a driver state. In further embodiments, a measurement of pressure of contact on the steering wheel 104 can correlate to a driver state. In some embodiments, the driver state can indicate a driver's perceived risk while driving, a stressful event, a hazard, a risk, and a hazardous conditions, among others. The vehicle systems 113 can be controlled based on the driver state to mitigate risk (e.g., collision) and provide active safety measures while driving. Determination of a driver state with control of the vehicle systems 113 will now be discussed in further detail A. Driver State The "state" of the biological being or "driver state," as used herein, refers to a measurement of a state of the biological being and/or a state of the environment surrounding (e.g., a vehicle) the biological being. A driver state or alternatively a "being state" can be one or more of alert, vigilant, drowsy, inattentive, distracted, stressed, intoxicated, anxious, tense, scared, calm, relaxed, perception of risk, other generally impaired states, other emotional states and/or general health states, among others. Throughout this specification, stressfulness and/or perceived risk will be used as the example driver state being assessed. However, it is understood that any driver state could be determined and assessed, including but not limited to, drowsiness, attentiveness, distractedness, vigilance, impairedness, intoxication, stress, emotional states and/or general health states, among others. It is understood that in some embodiments, one or more driver states can be determined based on different types of information.

A driver state can be quantified as a driver state level, a driver state index, among others. The driver state level can be a "level of stress." The term "level of stress" as used throughout this detailed description and in the claims refers to any numerical or other kind of value for distinguishing between two or more states of stress. For example, in some cases, the level of stress can be given as a percentage between 0% and 100%, where 0% refers to a driver that is not stressed and 100% refers to a driver that is extremely stressed. In other cases, the level of stress could be a value in the range between 1 and 10. In still other cases, the level of stress is not a numerical value, but could be associated with a given discrete state, such as "not stressed," "slightly stressed," "stressed," "very stressed" and "extremely stressed." Moreover, the level of stress could be a discrete value or a continuous value.

In another embodiment, the driver state level can be a "level of perceived risk." A perceived risk is the driver's perception of a hazard, a hazardous condition, a risk, a difficult driving situation, an uncomfortable driving satiation, among others. Thus, a perceived risk can be the driver's interpretation of a current driving scenario. For purposes of clarity, the term hazard or hazardous condition is used throughout to refer generally to one or more objects and/or driving scenarios that are perceived by the driver to pose a potential safety threat to a vehicle or the driver. The term "level of perceived risk" as used throughout this detailed description and in the claims refers to any numerical or other kind of value for distinguishing between two or more states of perceived risk. For example, in some cases, the level of perceived can be given as a percentage between 0% and 100%, where 0% refers to a driver that perceives no risks and 100% refers to a driver that fully perceives the risk. In other cases, the level of perceived risk could be a value in the range between 1 and 10. In still other cases, the level of perceived risk is not a numerical value, but could be associated with a given discrete state, such as "no perceived risk," "low perceived risk," "average perceived risk", "high perceived risk" and "very high perceived risk". Moreover, the level of perceived risk could be a discrete value or a continuous value. In some cases, the level of perceived risk can indicate that the driver and vehicle are experiencing or are approaching a hazardous condition.

As mentioned above, a driver state can be a physiological driver state, a behavioral driver state, or a vehicular-sensed driver state. A physiological driver state is based on physiological information from physiological monitoring systems and sensors (e.g., the monitoring systems 115). Physiological information includes information about the human body (e.g., a driver) derived intrinsically. Said differently, physiological information is measured by medical means and quantifies an internal characteristic of a human body. Physiological information is typically not externally observable to the human eye. However, in some cases, physiological information is observable by optical means, for example, heart rate measured by an optical device. Physiological information can include, but is not limited to, heart rate, blood pressure, oxygen content, blood alcohol content, respiratory rate, perspiration rate, skin conductance, brain wave activity, digestion information, salivation information, among others. Physiological information can also include information about the autonomic nervous systems of the human body derived intrinsically A vehicular-sensed driver state is based on vehicle information from vehicular monitoring systems and sensors (e.g., the vehicle sensors 108, the vehicle systems 113). Specifically, vehicle information for determining a vehicular-sensed driver state includes information related to the vehicle 102 of FIG. 1A and/or the vehicle systems 113 that relate to a driver of the vehicle 102. In particular, a driver transmits information when operating the vehicle 102 and the vehicle systems 113, and based on this operation, other types of information about the driver can be provided by the vehicle 102 and/or the vehicle systems 113. For example, when the driver operates the vehicle 102 and/or the vehicle systems 113, changes in vehicle acceleration, velocity, lane position, and direction all provide information that directly correlates to the driver and a state of the driver.

A behavioral driver state is based on behavioral information from behavioral monitoring systems and sensors (e.g., the monitoring systems 115). Behavioral information includes information about the human body derived extrinsically. Behavioral information is typically observable externally to the human eye. For example, behavioral information can include eye movements, mouth movements, facial movements, facial recognition, head movements, body movements, hand postures, hand placement, body posture, and gesture recognition, among others. Hand postures and hand placement can include contact with the steering wheel 104 as described herein. Behavioral driver state and behavioral information will be used throughout the detailed description to describe determining a driver state. However, it is understood that other driver states and information can also be implemented. Further, it is understood that one or more driver states can be combined to determine the driver state (e.g., a combined driver state index) and/or one or more driver states can be verified and/or confirmed with one another to determine the driver state.

B. Combined Driver State

As discussed in U.S. application Ser. No. 14/851,753 filed on Sep. 11, 2015, and published as U.S. Pub. No. 2016/0001781 on Jan. 7, 2016, which has been incorporated herein by reference, it is understood that one or more driver states can be used to determine a combined driver state level, a combined driver state index, among others. Thus, in some embodiments, controlling vehicle systems in a vehicle can depend on one or more driver states (e.g., a plurality of driver states), specifically, a combined driver state based on one or more driver states.

The "combined driver state," as used herein, refers to a combined measure of the state of the driver, for example the vigilance, stressfulness, perceived risk, the attention and/or the drowsiness of a driver. In some cases, the combined driver state could be given as a numerical value, for example a combined driver state level, a combined driver state index, among others. In other cases, the combined driver state could be given as a non-numerical value, for example, drowsy, non-drowsy, slightly drowsy, a Boolean value, among others. Moreover, the combined driver state can range from values associated with complete alertness (e.g., attentive) to values associated with extreme drowsiness (e.g., distraction) or even a state in which the driver is asleep (e.g., distraction). For example, in one embodiment, the combined driver state index could take on the values 1, 2, 3 and 4, where 1 is the least stressful and 4 is the most stressful. In another embodiment, the combined driver state index could take on values from 1-10. In other cases, the combined driver state can range from values associated with no stress (10 for example) to values associated complete stress (1 for example) and values there between.

The one or more driver states can be one of a physiological driver state, a behavioral driver state and a vehicular-sensed driver state. Thus, the combined driver state can be based on different types of driver states derived from different types of monitoring information (e.g., physiological information, behavioral information, vehicle information) and/or from information from different types of monitoring systems (e.g., physiological monitoring systems and sensors, behavioral monitoring systems and sensors, vehicular monitoring systems and sensors). The combined driver state can also be based on the same types of driver states or various combinations of driver states that can be derived from the same or different types of monitoring information and/or monitoring systems. Further, the one or more driver states can be determined, combined and/or and confirmed with one another. Determining, combining and/or confirming one or more driver states provides a reliable and robust driver monitoring system.

C. Vehicular State

In addition to determining driver states, the methods and systems discussed herein can also include determining one or more vehicular states and modifying the control of one or more vehicle systems 113 based on the driver state and/or the vehicular state, or any combination of one or more of said states. Thus, the vehicle systems 113 are modified not only based on the driver state, but also the current operating conditions and/or current situation of the vehicle 102. A vehicular state describes a state of a vehicle 102 and/or vehicle systems 113. In particular, in some embodiments, the vehicular state describes a state of the vehicle 102 based on external information about the vehicle environment. In one embodiment, the vehicular state can describe a risk surrounding the vehicle environment. For example, a vehicular state can be characterized as a hazard, a hazard level, and a risk level, among others.

A vehicular state is based on vehicle information from vehicular monitoring systems and sensors. Specifically, vehicle information for determining a vehicular state includes information related to the vehicle 102 of FIG. 1A and/or the vehicle systems 113. As an illustrative example, vehicle information for determining a vehicular state can include information about objects, pedestrians, hazards, and/or other vehicles in the environment of the vehicle, for example from visual devices, a collision warning system, an automatic cruise control system, a lane departure warning system, a blind spot indicator system, a lane keep assist system, a lane monitoring system, among others. Vehicle information for determining a vehicular state can include traffic information, weather information, road speed limit information, and navigation information.

Similar to the driver state discussed above, it is understood that the vehicular state can also be quantified as a level, a numeric value or a numeric value associated with a level. In some embodiments, the vehicular state can be characterized as a hazard, a type of hazard, a hazard level, and/or a risk level. As will be discussed herein, in one embodiment, controlling one or more vehicle systems is based on one or more driver states and one or more vehicular states.

D. Methods for Determining Driver State and/or Vehicular State and Controlling Vehicle Systems Determining a driver state and controlling vehicle systems will now be described in more detail with an exemplary method shown in FIG. 7, and with reference to the components of FIGS. 1A, 1B, 1C, and 2. Further, FIG. 7 will be described with respect to the illustrative examples shown in FIGS. 3A, 3B, and 3C. For brevity, some blocks from the methods discussed with FIGS. 4, 5, and 6 have been omitted from FIG. 7. However, it is understood that method 700 can include one or more blocks of the methods described in FIGS. 4, 5, and 6. For example, although not shown in FIG. 7, determining whether a vehicle is moving (e.g., block 408 of FIG. 4) and determining whether a non-driving passenger is present in the vehicle (e.g., block 424 of FIG. 4), can be incorporated with method 700. Conversely, it is understood that blocks of the method 700 omitted from the methods described in FIGS. 4, 5, and 6 can be implemented with said methods.

The method 700 starts at block 702 and includes at block 704, providing a steering wheel 200 having a plurality of sensors 210a, 210b configured to sense contact on the steering wheel 200. As discussed in detail above with FIG. 2, the steering wheel 200 has a left zone 212 and a right zone 214. The left zone 212 and the right zone 214 are defined by a vertical planar line 216 perpendicular to a center point 218 of the steering wheel 200. The steering wheel 200 has a plurality of sensors 210a, 210b configured to sense contact on the steering wheel 200. In one embodiment, the steering wheel 200 has two sensors (not shown): a first capacitive sensor located within the left zone 212 and a second capacitive sensor located within the right zone 214. In another embodiment, the steering wheel 200 has two sensors (not shown): a first pressure sensor located within the left zone 212 and a second pressure sensor located within the right zone 214

As mentioned above with FIG. 2, in some embodiments, the left zone 212 and the right zone 214 are defined as being located within an "upper half" or a "lower half" of the steering wheel 200. Thus, in one embodiment, the left zone 212 is located in an upper half of the steering wheel 200 where the left zone 212 is defined by the first left zone quadrant 222a. Said differently, the left zone 212 in an upper half of the steering wheel 200 includes areas of the steering wheel 200 located in a positive y-axis direction and a negative x-axis direction from the intersection of the vertical planar line 216 and the horizontal planar line 220 (e.g., from the center point 218). Thus, the right zone 214 in an upper half of the steering wheel 200 is defined as the first right zone quadrant 224a. Said differently, the right zone 214 includes areas of the steering wheel 200 located in a negative y-axis direction and a positive x-axis direction from the intersection of the vertical planar line 216 and the horizontal planar line 220 (e.g., from the center point 218).

Referring again to FIG. 7, at block 706, the method 700 includes receiving vehicle data from the vehicle sensors 108. In some embodiments, the processor 112 can receive the vehicle data and determine if the vehicle 102 is moving based on the vehicle data, for example, as shown at block 408 of FIG. 4. It is understood that in some embodiments, the method 700 can terminate at block 716 if a determination is made that the vehicle 102 is not moving, and the method 700 can proceed to block 708 if a determination is made that the vehicle 102 is moving, as described with block 408 of FIG. 4. In some embodiments, the method 700 at block 706 can include receiving other data from the vehicle systems 113 and/or the monitoring systems 115. For example, the processor 112 can receive physiological information, behavioral information and/or vehicular-sensed information from the vehicle systems 113 and/or the monitoring systems 115. In some embodiments, vehicle data received from the plurality of sensors 210a, 210b can be behavioral information to determine the contact values discussed herein. Thus, this behavioral information can be used to determine a behavioral driver state.

At block 708, the method 700 includes determining a left contact value. In some embodiments, the left contact value indicates a contact (e.g., of a left hand) with the steering wheel 200 within the left zone 212. In other embodiments, the left contact value indicates a measurement of pressure of the contact (e.g., of the left hand) with the steering wheel 200 within the left zone 212. In another embodiment, the left contact value can indicate both a contact (e.g., of a left hand with the steering wheel 200 within the left zone 212) and a measurement of pressure of the contact. In further embodiments, more than one left contact value can be determined, namely, a left contact value and a left pressure value. For example, the left contact value indicates a contact (e.g., of a left hand) with the steering wheel 200 within the left zone 212, and the left pressure value indicates a measurement of pressure of the contact (e.g., of the left hand) with the steering wheel 200 within the left zone 212.

More specifically, in one embodiment, the method 700 can include at block 708, receiving one or more signals from one or more of the sensors positioned in the left zone 212 of the steering wheel 200. Thus, the processor 112 receives one or more signals from one or more of the sensors 210a, 210b and determines a left contact value and/or a left pressure value based on the one or more signals. The left contact value and/or the left pressure value can be behavioral information. In another embodiment, one or more signals can be received from a first capacitive sensor (not shown) positioned in the left zone 212. In this embodiment, the left contact value determined at block 708 is based on data (e.g., signals) from a single sensor, the first capacitive sensor positioned in the left zone 212. In a further embodiment, one or more signals can be received from a first pressure sensor (not shown) positioned in the left zone 212. In this embodiment, the left pressure value determined at block 708 is based on data (e.g., signals) from a single sensor, the first pressure sensor positioned in the left zone 212.

Referring again to FIG. 7, at block 710, the method 700 includes determining a right contact value. In some embodiments, the right contact value indicates a contact (e.g., of a right hand) with the steering wheel 200 within the right zone 214. In other embodiments, the right contact value indicates a measurement of pressure of the contact (e.g., of the right hand) with the steering wheel 200 within the right zone 214. In another embodiment, the right contact value indicates a contact (e.g., of a right hand) with the steering wheel 200 within the right zone 214 and a measurement of pressure of the contact. In further embodiments, more than one right contact value can be determined, namely, a right contact value and a right pressure value. For example, the right contact value indicates a contact (e.g., of a right hand) with the steering wheel 200 within the right zone 214, and the right pressure value indicates a measurement of pressure of the contact (e.g., of the right hand) with the steering wheel 200 within the right zone 214.

More specifically, in one embodiment, the method 700 at block 710 can include receiving one or more signals from one or more of the sensors positioned in the right zone 214 of the steering wheel 200. Thus, the processor 112 receives one or more signals from one or more of the sensors 210a, 210b and determines a right contact value and/or a right pressure value based on the one or more signals. The right contact value and/or the right pressure value can be behavioral information. In another embodiment, one or more signals can be received from a first capacitive sensor (not shown) positioned in the right zone 214. In this embodiment, the right contact value determined at block 710 is based on data (e.g., signals) from a single sensor, the first capacitive sensor positioned in the right zone 214. In a further embodiment, one or more signals can be received from a first pressure sensor (not shown) positioned in the right zone 214. In this embodiment, the right pressure value determined at block 710 is based on data (e.g., signals) from a single sensor, the first pressure sensor positioned in the right zone 214.

At block 712, the method 700 includes determining a driver state index. In one embodiment, the driver state index is based on the left contact value and the right contact value. As discussed in detail above, a driver state index can be a measurement of a state of the biological being and/or a state of the environment surrounding (e.g., a vehicle) the biological being. Said differently, the driver state index can be a value on a continuum of values correlating with a measurement of a state of a driver. The driver state index can be based on a physiological driver state, a behavioral driver state, and/or a vehicular-sensed driver state. In the embodiments discussed with FIG. 7, a behavioral driver state is determined based on at least the left contact value and the right contact value. In this embodiment, the driver state index can be a measurement of perceived risk and/or a measurement of stress during driving. However, it is understood that more than one driver state (e.g., a plurality of driver states) can be determined at block 712, the driver state can be one or more types based on different types of information, and any driver state can be determined and/or assessed (e.g., drowsiness, attentiveness, distractedness).

Referring again to FIG. 7, in one embodiment, determining the driver state index at block 712 is based on comparing the left contact value and the right contact value to one or more thresholds. For example, determining a driver state index can include comparing the left contact value to a left contact threshold. In one embodiment, the left contact threshold can be determined based on a left contact surface area 226 of the steering wheel 200 within the left zone 212. The left contact surface area 226 can maximize contact of a left hand with the steering wheel 200 within the left zone 212, as described with block 420 of FIG. 4. In one embodiment, the left contact threshold is a value that when exceeded indicates the left hand is in an upper half of the steering wheel 200 within the left zone 212. Although not shown in FIG. 7, it is appreciated that the method 700 can also include determining and/or modifying the left contact threshold as described with block 421 of FIG. 4.

In another embodiment, the left contact threshold is a left pressure threshold. The left pressure threshold can be a pressure magnitude (e.g., a measurement of pressure) that when exceeded can indicate a driver state. For example, in one embodiment, the left pressure threshold is a pressure magnitude of an average left hand grip (e.g., pressure of a normal left hand contact) on the steering wheel 200. If the left contact value exceeds the pressure threshold, this can indicate the driver's perceived risk (e.g., driver state) is higher than average (e.g., the driver is experiencing difficult driving conditions, hazardous conditions, a stressful event). If the left contact value is lower than the pressure threshold, this can indicate the driver's perceived risk (e.g., driver state) is lower than average (e.g., relaxed, low stress, distracted, inattentive). As an illustrative example, a left pressure threshold of 60 kPa can indicate a high perceived risk. In some embodiments, the left pressure threshold can have a range (e.g., a tolerance). For example, the left pressure threshold indicating a high perceived risk can be 60 kPa+/− 20 kPa. As another illustrative example, a left pressure threshold of 20 kPa can indicate no perceived risk.

Similar to block 421 of FIG. 4, in some embodiments, the left pressure threshold can be determined and/or modified based on different parameters (e.g., vehicle data received at block 706). As described above, the left pressure threshold can be a dynamic threshold and can be determined based on an environmental offset value (e.g., an environmental condition). In another embodiment, the left pressure threshold can be determined and/or modified based on hand pressure data previously stored at the vehicle 102. In some embodiments, the left pressure threshold is based on average pressure exerted by an average left hand size of an average adult. In other embodiments, the left pressure threshold can be based on the size of the left hand of the driver D. This information can be stored at the vehicle 102, for example, at the processor 112 and/or the logic circuitry 114. For example, the size of the left hand of the driver D can be manually input and stored at the vehicle 102. In another embodiment, the size of the left hand of the driver D can be learned and stored based on vehicle data received from vehicle sensors 108.

Referring back to FIG. 7, at block 712 determining a driver state index can also include comparing the right contact value to a right contact threshold. In one embodiment, the right contact threshold can be determined based on a right contact surface area 228 of the steering wheel 200 within the right zone 214. The right contact surface area 228 can maximize contact of a right hand with the steering wheel 200 within the right zone 214, as described with block 422 of FIG. 4. In one embodiment, the right contact threshold is a value that when exceeded indicates the right hand is in an upper half of the steering wheel 200 within the right zone 214. Although not shown in FIG. 7, it is appreciated that the method 700 can also include determining and/or modifying the right contact threshold as described with block 421 of FIG. 4.

In another embodiment, the right contact threshold is a right pressure threshold. The right pressure threshold can be a pressure magnitude that when exceeded can indicate a driver state. For example, in one embodiment, the right pressure threshold is a pressure magnitude of an average right hand grip (e.g., pressure of a normal right hand contact) on the steering wheel 200. If the right contact value exceeds the pressure threshold, this can indicate the driver's perceived risk (e.g., driver state) is higher than average (e.g., the driver is experiencing difficult driving conditions, hazardous conditions, stressful event). If the right contact value is lower than the pressure threshold, this can indicate the driver's perceived risk (e.g., driver state) is lower than average (e.g., relaxed, low stress, distracted, inattentive, drowsy). As an illustrative example, a right pressure threshold of 60 kPa can indicate a high perceived risk. In some embodiments, the right pressure threshold can have a range (e.g., a tolerance). For example, the right pressure threshold indicating a high perceived risk can be 60 kPa+/−20 kPa. As another illustrative example, a right pressure threshold of 20 kPa can indicate no perceived risk.

Similar to block 421 of FIG. 4, in some embodiments, the right pressure threshold can be determined and/or modified based on different parameters (e.g., vehicle data received at block 706). As described above, the right pressure threshold can be a dynamic threshold and can be determined based on an environmental offset value (e.g., an environmental condition). In another embodiment, the right pressure threshold can be determined and/or modified based on hand pressure data previously stored at the vehicle 102. In some embodiments, the right pressure threshold is based on average pressure exerted by an average right hand size of an average adult. In other embodiments, the right pressure threshold can be based on the size of the right hand of the driver D.

In some embodiments, determining the driver state index at block 712 can be based on comparing the left contact value and the right contact value to a single threshold. For example, a total contact value can be determined based on the left contact value and the right contact value (e.g., an aggregation of the left contact value and the right contact value). The total contact value can be compared to a single contact threshold to determine the driver state index. In other embodiments, determining the driver state index at block 712 can be based on the left contact value, the right contact value, the left pressure value, and the right pressure value. Thus, in this embodiment, the driver state index is based on maximizing contact of the left hand on the steering wheel, maximizing contact of the right hand on the steering wheel, a pressure of the contact of the left hand on the steering wheel, and a pressure of the contact of the right hand on the steering wheel. With respect to this embodiment, the driver state index can be based on comparing the left contact value, the right contact value, the left pressure value, and the right pressure value to one or more thresholds. For example, as discussed above, the left contact value can be compared to a left contact threshold and the right contact value can be compared to a right contact threshold. Similarly, a left pressure value can be compared to a left pressure threshold and a right pressure value can be compared to a right pressure threshold. It is understood that in some embodiments, a single threshold can be used. For example, the left pressure value and the right pressure value can be compared with the same pressure threshold.

In one embodiment, at block 714, determining a driver state index can include determining a plurality of driver states. The plurality of driver states can be used to determine a combined driver state index at block 716. In this embodiment, a first driver state can be based on the left contact value and the right contact value, while a second driver state can be based on the left pressure value and the right pressure value. Similar to the embodiments discussed above, the first driver state can be based on comparing the left contact value and the right contact value to one or more contact thresholds. The second driver state can be based on comparing the left pressure value and the right pressure to one or more pressure thresholds.

Figure 8:
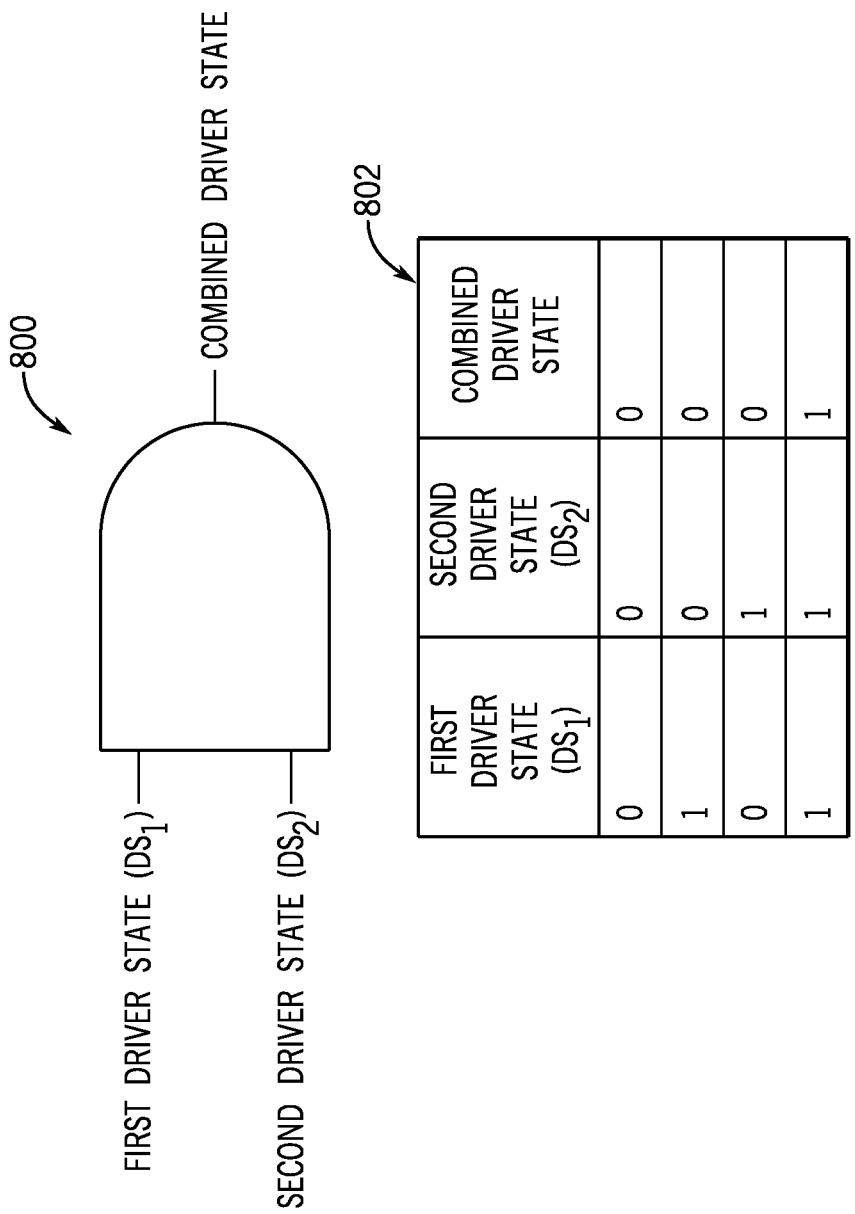
FIG. 8 is a schematic view of an AND logic gate for combining a plurality of driver states (i.e., two driver states) to determine a combined driver state according to an exemplary embodiment.

At block 716, the first driver state and the second driver state can be combined and/or confirmed to determine a combined driver state index. In some embodiments, AND/OR logic gates can be executed by the processor 112 to determine a combined driver state index at block 716. FIG. 8 illustrates an exemplary AND logic gate 800 for determining a combined driver state index based on a first driver state ($DS_1$) and a second driver state ($DS_2$). In this example, the first driver state is a behavioral driver state indicating contact on the steering wheel 200 (e.g., based on comparing the left contact value and the right contact value to one or more contact thresholds). The second driver state is a behavioral driver state indicating a measurement of pressure of the contact on the steering wheel 200 (e.g., based on comparing the left pressure value and the right pressure to one or more pressure thresholds). It is understood that any number of driver states and different types of driver states can be implemented with the AND logic gate 800 of FIG. 8. Further, it is understood that the combined driver state index can also be determined with an AND/OR gate logic (not shown).

At the AND logic gate 800, the processor 112 analyzes the first driver state and the second driver state to determine a combined driver state. In the illustrative examples discussed herein, stressfulness will be used as an exemplary driver state, however, it is understood that other driver states can be implemented. For example, if the first driver state indicates a stressful driver state (i.e., YES; 1) and the second driver state indicates a stressful driver state (i.e., YES; 1), the combined driver state returned by the AND logic gate 800 indicates a stressful driver state (i.e., YES; 1), based on the first driver state and the second driver state. In another example, if the first driver state indicates a non-stressful driver state (i.e., NO; 0), and the second driver state indicates a stressful driver state (i.e., YES; 1), the combined driver state returned by the AND logic gate 800 indicates a non-stressful driver state (i.e., NO; 0), based on the first driver state and the second driver state. A truth table 802 illustrates the various combinations and functions for the AND logic gate 800. Although the AND logic gate 800 is described with Boolean values, it is understood that in other embodiments, the first driver state, the second driver state and the combined driver state can each include numeric values (e.g., a driver state index, a combined driver state index).

Referring again to FIG. 7, in some embodiments, method 700 of FIG. 7 can also include at block 718, determining a vehicular state. Thus, in addition to determining a driver state, the systems and methods discussed herein can also determine a vehicular state and modify control of the vehicle systems 113 based on the driver state and/or the vehicular state. As discussed above in detail, a vehicular state describes a state of the vehicle 102 and/or the vehicle systems 113. In particular, in some embodiments, the vehicular state describes a state of the vehicle 102 based on external information about the vehicle environment. In one embodiment, the vehicular state can describe a risk surrounding the vehicle environment. In a further embodiment, the vehicular state can indicate whether a hazard exists. A vehicular state can be characterized as a hazard, a hazard level, and a risk level, among others. For purposes of clarity, the term hazard, or hazardous condition, is used throughout this detailed description and in the claims to refer generally to one or more objects and/or driving scenarios that pose a potential safety threat to a vehicle. As will be discussed herein, the vehicular state can be used to confirm and/or verify the driver state index and/or the combined driver state index for modifying control of vehicle systems 113.

In some embodiments, the method 700 can include at block 720, determining if a perceived risk exists based on the driver state index. In other embodiments, block 720 can include determining if a perceived risk is high based on the driver state index. It is understood that in some embodiments, determining if a perceived risk exists is based on the combined driver state index and/or the vehicular state. To determine if a perceived risk exists and/or the perceived risk is high, the driver state index can be compared to a predetermined threshold. If the determination at block 720 is YES, the method 700 proceeds to block 722. Otherwise, if the determination at block 720 is NO, the method 700 can end at block 724.

At block 722, the method 700 includes modifying control of the vehicle systems 113. Modifying control of the vehicle systems 113 can be based on the driver state index. In another embodiment, modifying control of the vehicle systems 113 can be based on the combined driver state index. In a further embodiment, modifying control of the vehicle systems 113 can be based on the driver state index and/or the combined driver state index, and the vehicular state. Exemplary control of the vehicle systems 113 will be described in further detail in Section VI.

E. Methods for Determining Combined Driver State with Confirmation of Driver States and/or Vehicular States As mentioned above, in one embodiment, the plurality of driver states, the driver state index and/or the combined driver state index can be confirmed with each other to modify control of the vehicle systems 113. Further, in other embodiments, the driver state index and the vehicular state can be used and/or confirmed to modify control of the vehicle systems 113. The term "confirming," as used herein can include comparing two values to validate the state of the driver. Accordingly, a first driver state can be confirmed with a second driver state by comparing the first driver state to the second driver state and determining if the first driver state and the second driver state both indicate the same or substantially the same driver state. In other embodiments, a driver state could be compared to a vehicular state to determine if both states indicate a hazard exists. Blocks 712, 714, 716, and 718 of FIG. 7 will now be described in more detail with reference to FIGS. 9 and 10.

Figure 9:
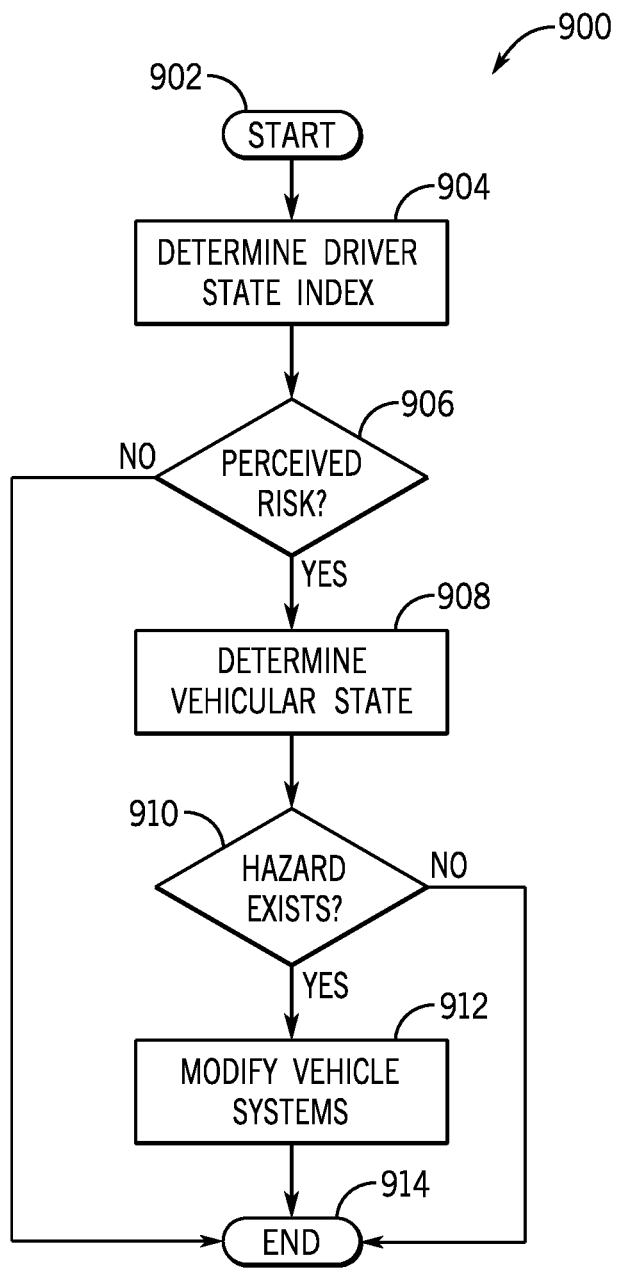
FIG. 9 is a flow diagram of an exemplary method for controlling vehicle systems in a vehicle based on confirming a driver state and a vehicular state.

FIG. 9 is a flow chart of an illustrative process of controlling vehicle systems based on a confirmation of a driver state index and a vehicular state. FIG. 9 will be described with reference to FIGS. 1A and 2. Further, for brevity, it is understood that blocks of FIG. 9 can include similar functions and components of like blocks discussed above with FIG. 7. With reference to FIG. 9, method 900 starts at block 902 and includes determining a driver state index at block 904. In some embodiments, block 904 includes determining a combined driver state index. At block 906, the method 900 includes determining whether a perceived risk exists. For example, the driver state index can be compared to a threshold to determine if a perceived risk exists. If the determination at block 906 is YES, the method 900 proceeds to block 908. Otherwise, the method 900 terminates at block 914.

At block 908, the method includes determining a vehicular state. As mentioned above, in some embodiments, the vehicular state can indicate a hazard or a hazardous condition. Accordingly, at block 910 it is determined if a hazard exists based on the vehicular state. For example, the vehicular state can be compared to a threshold to determine if a hazard exists. If the determination at block 910 is YES, the method 900 proceeds to block 912. Otherwise, the method 900 terminates at block 914.

At block 912, the method 900 includes modifying control of the vehicle systems based on the driver state index and the vehicular state. In other embodiments modifying the vehicle systems is based on the driver state index, the vehicular state, and the hazard. Thus, according to the method 900 of FIG. 9, a driver's perceived risk of a hazardous condition is confirmed based on detecting a hazard.

Figure 10:
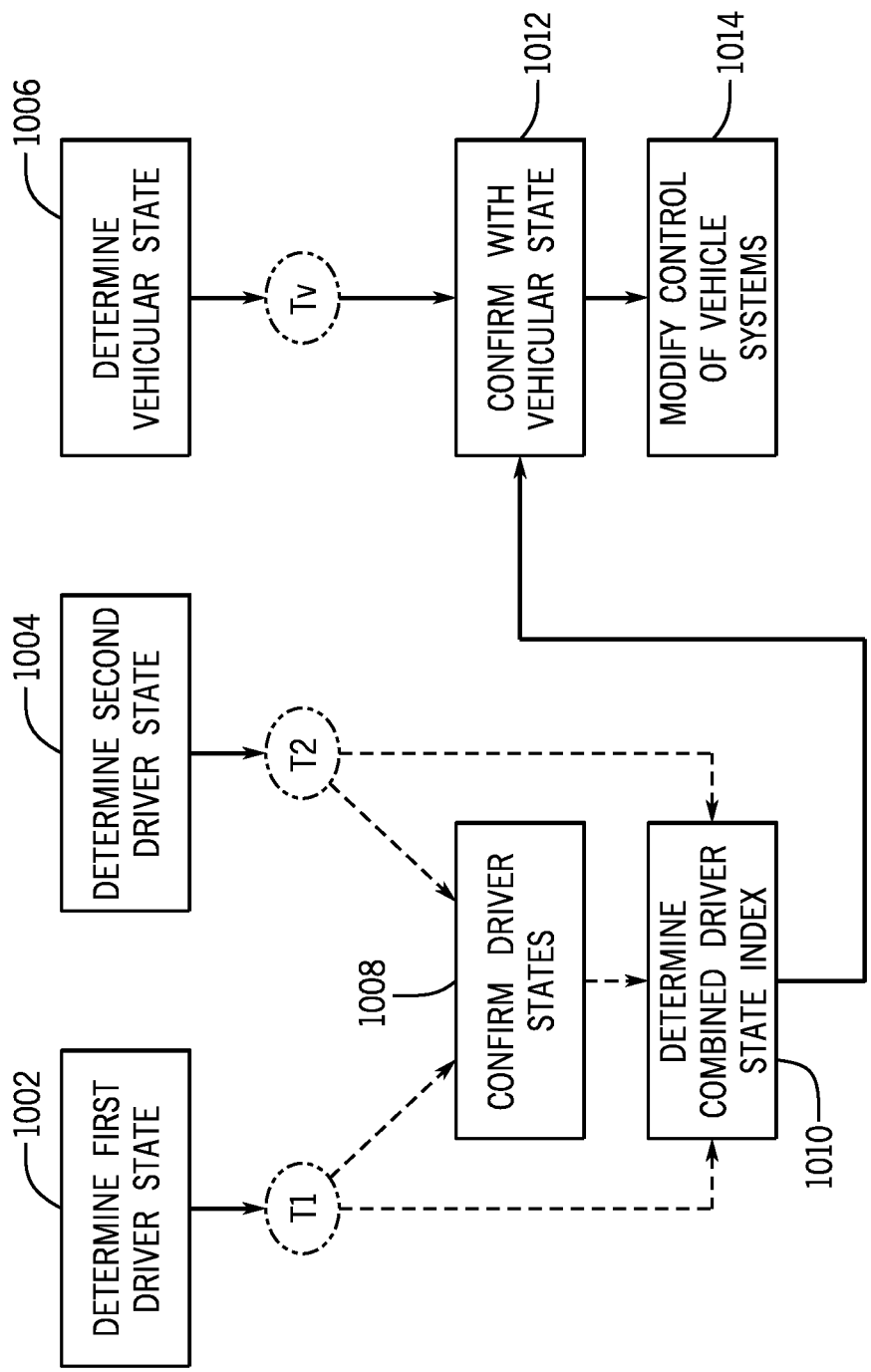
FIG. 10 is a flow diagram of an illustrative process of controlling vehicle systems according to combined driver state index and a vehicular state according to an exemplary embodiment.

Referring now to FIG. 10, a detailed illustrative process of controlling vehicle systems based on a confirmation of a driver state index and a vehicular state will be described. FIG. 10 will be described with reference to FIGS. 1A and 2. Further, for brevity, it is understood that blocks of FIG. 10 can include similar functions and components of like blocks discussed above with FIGS. 7 and 9. At block 1002, the method 1000 includes determining a first driver state, for example, based on the left contact value and the right contact value. At block 1004, the method 1000 includes determining a second driver state, for example, based on the left pressure value and the right pressure value. In this embodiment, the first driver state and the second driver state are behavioral driver states. However, in other embodiments, different types of driver states (e.g., physiological, vehicular-sensed) can be determined.

At block 1006, the method 1000 includes determining a vehicular state based on vehicle data received from the vehicle systems 113. Each of the first driver state, the second driver state, and the vehicular state can optionally be passed through respective thresholds (e.g., $T_1$, $T_2$, $T_v$). With regards to the first driver state and the second driver state, at block 1008, the first driver state and the second driver state can be confirmed. Accordingly, the first driver state is compared to the second driver state to determine if the first driver state and the second driver state indicate the same or substantially the same driver state (e.g., the first driver state and the second driver state each indicate a stressed driver state).

In one embodiment, block 1008 can be a decision step. Thus, if the outcome of block 1008 is YES (i.e., driver states are the same or substantially similar), the method 1000 can proceed to block 1010 to determine a combined driver state based on the first drive state and the second driver state. In another embodiment, the first driver state and the second driver state may not be confirmed (i.e., driver states are not the same or substantially similar), but can be used to determine a combined driver state index at block 1010.

Further, the combined driver state index can be confirmed and/or compared to the vehicular state at block 1012. In one embodiment, block 1012 can be a decision step. Thus, if the outcome of block 1012 is YES (i.e., the combined driver state is confirmed with the vehicular state), the processor 112 can modify the control of the vehicle systems 113 at step 1014 based on the combined driver state index and the vehicular state.

VI. Exemplary Control of Vehicle Systems Based on Driver State and/or Vehicular State Illustrative examples shown in FIGS. 3A, 3B and 3C will now be discussed with reference to FIGS. 1A, 2, 7, and 8. For simplicity, the elements and configuration of the steering wheel 200 shown in FIG. 2 will be used throughout the discussion. Further, the elements and configuration of the steering wheel 200 shown in FIG. 2 will be used throughout the discussion. As discussed in detail in Section IV with FIG. 3A, the left contact threshold is determined based on the left contact surface area 226 and the right contact threshold is determined based on the right contact surface area 228 as discussed above. For purposes of discussion, the left contact threshold is equal to 50 and the right contact threshold is equal to 50. In FIG. 3A, the left hand 238 is in contact with the steering wheel 200 within the left contact surface area 226. Accordingly, in this example, for purposes of discussion, the left contact value is 70. Similarly, the right hand 240 is in contact with the steering wheel 200 within the right contact surface area 228. The right hand 240 is gripped around the steering wheel 200. Accordingly, in this example, for purposes of discussion, the right contact value is 70.

Figure 7:
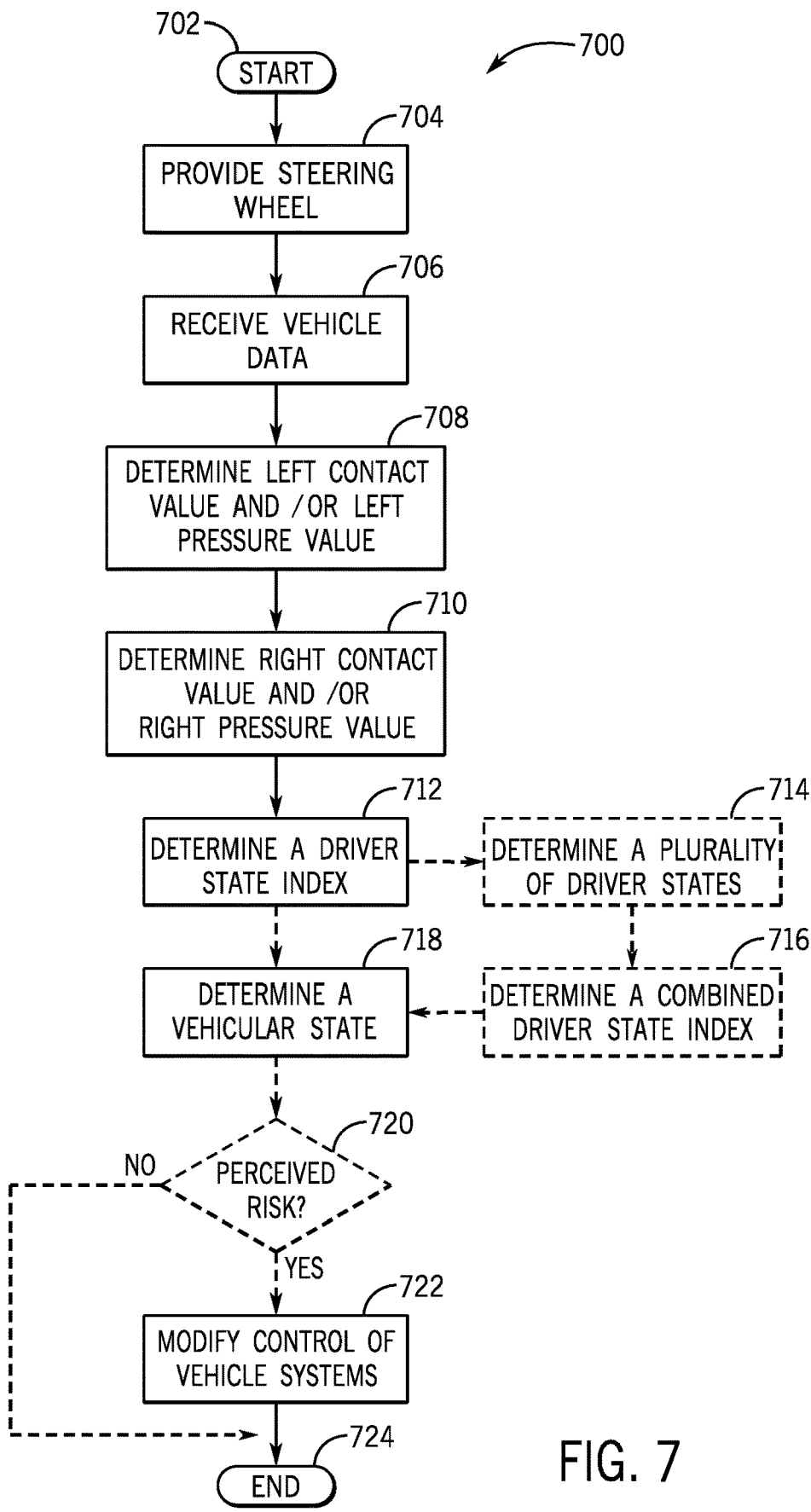
FIG. 7 is a flow diagram of an exemplary method for controlling vehicle systems in a vehicle based on driver state and/or vehicular state according to an embodiment.

According to block 712 of FIG. 7, in one embodiment, the driver state index is based on the right contact value and the left contact value. In one embodiment, the driver state index could be determined as an aggregate of the left contact value and the right contact value. In another embodiment, the driver state index is based on a comparison of the left contact value to a left contact threshold and a comparison of the right contact value to the right contact threshold. In this example, the left contact value is greater than the left contact threshold and the right contact value is greater than the right contact threshold. Thus, in this example, the driver state index indicates a high perceived risk.

Conversely, as shown in FIG. 3B, a left hand 242 is shown in the same position as the left hand 238 in FIG. 3A. However, in contrast to FIG. 3A, a right hand 244 is shown in the right zone 214 in a position lower than the right hand 240 of FIG. 3A. As can be seen in FIG. 3B, the contact surface area 245 where the right hand 244 is in contact with the steering wheel 200 does not maximize contact with the right hand 244. Specifically, at the contact surface area 245, the palm of the right hand 244 is not in contact with the steering wheel 200. Accordingly, in the example shown in FIG. 3B, the right contact value is lower than the right contact value associated with the right hand 240 in the example shown in FIG. 3A. For purposes of discussion, the right contact value of the right hand 244 for the example shown in FIG. 3B is 30. Thus, in FIG. 3B, the left contact value is greater than the left contact threshold and the right contact value is less than the right contact threshold.

According to block 712 of FIG. 7, in one embodiment, the driver state index is based on the right contact value and the left contact value. In this example, the driver state index can indicate the perceived risk is lower than the perceived risk (i.e., driver state) associated with FIG. 3A. For example, in FIG. 3B, the driver state index can indicate a slight perceived risk. The driver state index can be based on the left contact value, the right contact value, and/or the comparisons described above.

As another example, if the left hand 242 in FIG. 3B was positioned similarly to the right hand 244, but in the left zone 212 (not shown), the left contact value would be lower than the left hand 238 of FIG. 3A. Accordingly, in this example, the driver state index would indicate the perceived risk is lower than a slight perceived risk in the example associated with FIG. 3b. Thus, the driver state index in this example can indicate very low perceived risk.

Referring again to the illustrative example of FIG. 3A, in another example, the driver state index is based on the left contact value, the right contact value, a left pressure value, and a right pressure value. Accordingly, if a left pressure value of the left hand 238 exceeds a left pressure threshold and a right pressure value of the right hand 240 exceeds a right pressure threshold, the driver state index can indicate a higher perceived risk than a driver state index based on the left contact value and the right contact value alone. Alternatively, the driver state index could be based on the left pressure value of the left hand 238 and the right pressure value of the right hand 240 alone.

Based on the driver state index, the vehicle systems 113 can be modified according to block 718 of FIG. 7. Exemplary control of vehicle systems will be now be described with the exemplary driver state indices discussed above. In one embodiment, the vehicle systems 113 include a blind spot monitoring system (not shown). A function of the blind spot monitoring system can be controlled based on the driver state index. For example, if the driver state index indicates high perceived risk, the size of a blind spot monitoring zone (not shown) can be increased. An enlarged blind spot monitoring zone will provide extra assistance to the driver by warning the driver earlier of vehicles that enter the enlarged blind spot monitoring zone. If the driver state index indicates a slight perceived risk, the blind spot monitoring zone can be increased in size, but the increase is not as large as the enlarged blind spot monitoring zone associated with a high perceived risk. Furthermore, if the driver state index indicates a very low perceived risk, the size of the blind spot monitoring zone can be decreased. A decreased blind spot monitoring zone will decrease can minimize warnings that may disturb the driver.

Referring again to FIG. 7, as discussed above, a vehicular state can also be determined and can be used in conjunction with a driver state index to modify vehicle systems 113. As an illustrative example, a vehicular state can include information about objects around the vehicle, detected for example, by the blind spot indicator system. As an illustrative example, if the blind spot indicator system can indicate a target vehicle (not shown) is in a blind spot monitoring zone (not shown). In some embodiments, based on this information, it can be determined that a hazardous condition exists. Accordingly, in one in embodiment, at block 718 of FIG, the processor 112 can modify a lane keeping assist system (e.g., the vehicle systems 113) to activate at an earlier time based on the driver state index since the driver state index indicates a perceived risk. In addition, the processor 112 can modify the lane keeping assist system to provide lane control assistance based on a location of the target vehicle in the blind spot monitoring zone. Although the examples discussed herein implement a blind spot monitoring system and a lane keeping assist system, it is understood that other vehicle systems 113 can be implemented.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling vehicle systems in a vehicle, comprising:
   determining a vehicular state that describes the state of the vehicle based on vehicle data from visual devices associated with the vehicle, wherein the vehicle data includes information about hazards in an environment of the vehicle;
   providing a steering wheel having a plurality of sensors configured to sense a vehicle occupant having contact with the steering wheel, the steering wheel having a left zone and a right zone;
   determining a left contact value based on one or more signals received from at least one of the plurality of sensors, wherein the left contact value indicates the vehicle occupant's contact with the steering wheel within the left zone;
   determining a right contact value based on the one or more signals received from the at least one of the plurality of sensors, wherein the right contact value indicates the vehicle occupant's contact with the steering wheel within the right zone;

determining a left threshold being applied within a left contact surface area of the steering wheel within the left zone, wherein the left threshold varies based on a location of the left contact surface area on the steering wheel;

comparing the left contact value to a left contact threshold, wherein the left contact threshold is determined based on the left threshold and a left surface area threshold;

determining a right threshold being applied within a right contact surface area of the steering wheel within the right zone, wherein the right threshold varies based on a location of the right contact surface area on the steering wheel;

comparing the right contact value to a right contact threshold, wherein the right contact threshold is determined based on the right threshold and a right surface area threshold;

determining a driver state index that describes the vehicle occupant based on the left contact value satisfying the left contact threshold and the right contact value satisfying the right contact threshold, wherein the driver state index is a measurement of the vehicle occupant's perceived risk during driving, wherein the determination of the driver state index is independent of the vehicular state;

confirming the driver state index based on the vehicular state, wherein the confirming the driver state index includes determining a hazard exists by comparing the driver state index to the vehicular state; and modifying control of the vehicle systems based on the driver state index to manage the perceived risk, wherein modifying control of the vehicle includes activating the visual devices at an earlier time based on the driver state index.

2. The computer-implemented method of claim 1, wherein the left zone and the right zone are defined by a vertical planar line perpendicular to a center point of the steering wheel, wherein the left zone is further defined by a predetermined angle between the center point of the steering wheel and the vertical planar line within the left zone at 120 degrees and the right zone is further defined by a predetermined angle between the center point of the steering wheel and the vertical planar line within the right zone at 120 degrees.

3. The computer-implemented method of claim 1, wherein the left contact threshold is determined based on a left contact surface area of the steering wheel within the left zone, wherein the left contact surface area maximizes contact of a left hand with the steering wheel within the left zone, and wherein the right contact threshold is determined based on a right contact surface area of the steering wheel within the right zone, wherein the right contact surface area maximizes contact of a right hand with the steering wheel within the right zone.

4. The computer-implemented method of claim 1, wherein the left contact value is a measurement of pressure of the contact with the steering wheel within the left zone, and the right contact value is a measurement of pressure of the contact with the steering wheel within the right zone.

5. The computer-implemented method of claim 1, wherein the left contact value indicates contact with the steering wheel within the left zone and a measurement of pressure of the contact with the steering wheel within the left zone, and the right the contact value indicates contact with the steering wheel within the right zone and a measurement of pressure of the contact with the steering wheel within the right zone.

6. The computer-implemented method of claim 1, wherein the driver state index is a value on a continuum of values correlating with a measurement of a state of a driver.

7. The computer-implemented method of claim 1, wherein the left contact value is a measurement of capacitance based on the contact with the steering wheel within the left zone, and the right contact value is a measurement of capacitance based on the contact with the steering wheel within the right zone.

8. A system for controlling vehicle systems in a vehicle, comprising:

a memory storing instructions;

a steering wheel having a plurality of sensors configured to sense contact on the steering wheel, the steering wheel having a left zone and a right zone; and a processor, wherein the processor receives one or more signals from at least one of the plurality of sensors and determines a left contact value based on the one or more signals, the left contact value indicating contact with the steering wheel within the left zone, and the processor determines a right contact value based on the one or more signals, the right contact value indicating contact with the steering wheel within the right zone, the processor being configured to execute the instructions causing the processor to:

determine a left threshold being applied within a left contact surface area of the steering wheel within the left zone, wherein the left threshold varies based on a location of the left contact surface area on the steering wheel;

compare the left contact value to a left contact threshold, wherein the left contact threshold is determined based on the left threshold and a left surface area threshold;

determine a right threshold being applied within a right contact surface area of the steering wheel within the right zone, wherein the right threshold varies based on a location of the right contact surface area on the steering wheel;

compare the right contact value to a right contact threshold, wherein the right contact threshold is determined based on the right threshold and a right surface area threshold; and determine a driver state index that describes a vehicle occupant based on the left contact value satisfying the left contact threshold and the right contact value satisfying the right contact threshold, the processor determines a vehicular state that describes the state of the vehicle based on vehicle data from visual devices associated with the vehicle systems, the processor confirms the driver state index based on the vehicular state, and the processor controls the vehicle systems based on the driver state index and the vehicular state, wherein the vehicle data includes information about hazards and in an environment of the vehicle, wherein the confirming the driver state index includes determining a hazard exists by comparing the driver state index to the vehicular state, wherein the driver state index is a measurement of the vehicle occupant's perceived risk during driving, wherein the control of the vehicle systems is based on the driver state index to manage the perceived risk, wherein the determination of the driver state index is independent of the vehicular state; and wherein modifying control of the vehicle includes activating the visual devices at an earlier time based on the driver state index.

9. The system of claim 8, wherein the processor receives vehicle data from vehicle sensors of the vehicle and upon determining a non-driving passenger is present in the vehicle based on the vehicle data, the processor controls the vehicle systems based on the driver state index.

10. The system of claim 8, wherein the left contact value is a measurement of pressure of the contact with the steering wheel within the left zone, and the right contact value is a measurement of pressure of the contact with the steering wheel within the right zone.

11. The system of claim 8, wherein the left contact value is a measurement of capacitance based on the contact with the steering wheel within the left zone, and the right contact value is a measurement of capacitance based on the contact with the steering wheel within the right zone.

12. A non-transitory computer readable medium comprising instructions that when executed by a processor perform a method for controlling vehicle systems in a vehicle, comprising:

determining a vehicular state that describes the state of the vehicle based on vehicle data from visual devices associated with the vehicle systems, wherein the vehicle data includes information hazards in an environment of the vehicle;

providing a steering wheel having a plurality of sensors configured to sense contact of a vehicle occupant on the steering wheel, the steering wheel having a left zone and a right zone;

determining a left contact value based on one or more signals received from at least one of the plurality of sensors, wherein the left contact value indicates contact with the steering wheel within the left zone;

determining a right contact value based on the one or more signals received from the at least one of the plurality of sensors, wherein the right contact value indicates contact with the steering wheel within the right zone;

determining a left threshold being applied within a left contact surface area of the steering wheel within the left zone, wherein the left threshold varies based on the location of the left contact surface area on the steering wheel;

comparing the left contact value to a left contact threshold, wherein the left contact threshold is determined based on the left threshold and a left surface area threshold;

determining a right threshold being applied within a right contact surface area of the steering wheel within the right zone, wherein the right threshold varies based on the location of the right contact surface area on the steering wheel;

comparing the right contact value to a right contact threshold, wherein the right contact threshold is determined based on the right threshold and a right surface area threshold;

determining a driver state index that describes the vehicle occupant associated with a perceived risk of the vehicle occupant associated with a hazard based on the left contact value satisfying the left contact threshold and the right contact value satisfying the right contact threshold, wherein the determination of the driver state index is independent of the vehicular state;

confirming the driver state index based on the vehicular state, wherein the confirming the driver state index includes determining a hazard exists by comparing the driver state index to the vehicular state; and modifying control of the vehicle systems based on the driver state index, wherein modifying control of the vehicle includes activating the visual devices at an earlier time based on the driver state index.

13. The non-transitory computer readable medium of claim 12, wherein the left contact value is a measurement of pressure of the contact with the steering wheel within the left zone, and the right contact value is a measurement of pressure of the contact with the steering wheel within the right zone.

14. The non-transitory computer readable medium of claim 12, including determining a risk level of the hazard based on at least one of the driver state index, the left contact value, and the right contact value, wherein modifying the control of the vehicle systems is based on the risk level.

15. The non-transitory computer readable medium of claim 12, wherein the left contact value is a measurement of capacitance based on the contact with the steering wheel within the left zone, and the right contact value is a measurement of capacitance based on the contact with the steering wheel within the right zone.

* * * * *